(12) United States Patent
Kawaguchi et al.

(10) Patent No.: US 7,424,034 B2
(45) Date of Patent: Sep. 9, 2008

(54) INFORMATION CONVERTING APPARATUS

(75) Inventors: Kyoko Kawaguchi, Tokyo (JP); Kouji Hatano, Tokyo (JP); Masataka Sugiura, Tokyo (JP); Eiji Takahashi, Tokyo (JP); Yoshihiro Tsukamoto, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1044 days.

(21) Appl. No.: 10/307,362

(22) Filed: Dec. 2, 2002

(65) Prior Publication Data

US 2003/0103528 A1 Jun. 5, 2003

(30) Foreign Application Priority Data

Nov. 30, 2001 (JP) ............................. 2001-366930
Nov. 8, 2002 (JP) ............................. 2002-326067

(51) Int. Cl.
*H04J 3/16* (2006.01)
*H04J 3/22* (2006.01)
*H04K 1/00* (2006.01)
*H04L 9/00* (2006.01)
*H04L 9/32* (2006.01)
*G06F 7/04* (2006.01)
*G06F 17/30* (2006.01)
*H03M 1/68* (2006.01)
*H04N 7/16* (2006.01)

(52) U.S. Cl. .......................... 370/466; 705/51; 705/59; 726/27; 726/29

(58) Field of Classification Search ................ 705/51, 705/57; 370/466; 726/27, 29
See application file for complete search history.

(56) References Cited

U.S. PATENT DOCUMENTS

| 5,634,012 | A | 5/1997 | Stefik |
| 5,638,443 | A | 6/1997 | Stefik et al. |
| 5,867,714 | A | 2/1999 | Todd et al. |
| 5,889,953 | A | 3/1999 | Thebaut et al. |
| 5,920,861 | A | 7/1999 | Hall et al. |
| 6,009,401 | A | 12/1999 | Horstmann |
| 6,138,119 | A | 10/2000 | Hall et al. |

(Continued)

FOREIGN PATENT DOCUMENTS

EP 0715246 6/1996

(Continued)

OTHER PUBLICATIONS

English Language Abstract for JP Appln. No. 2001-202088.

(Continued)

*Primary Examiner*—Kevin C Harper
(74) *Attorney, Agent, or Firm*—Greenblum & Bernstein, P.L.C.

(57) ABSTRACT

A technique that can enhance convenience on each of both sides that distribute and use content under the conditions where use limitations intended to protect the copyright of content have diversified. According to this technique, a right gateway 100 is provided, that converts the condition of use in the right information of content subject to transmission from repository 20 at the transmitting end to repository 30 at the transmission destination in accordance with the right management capacity (capacity information 200) of content in repository 30 at the transmission destination. With right gateway 100 performing processing, the range of equipment and recording mediums capable of use of content expands, thereby promoting the use of content.

21 Claims, 28 Drawing Sheets

U.S. PATENT DOCUMENTS

| | | |
|---|---|---|
| 6,421,719 B1 | 7/2002 | Lewis et al. |
| 6,567,847 B1 | 5/2003 | Inoue |
| 6,944,776 B1 | 9/2005 | Lockhart et al. |
| 7,136,838 B1 | 11/2006 | Peinado et al. |
| 2001/0000541 A1 | 4/2001 | Schreiber et al. |
| 2001/0042043 A1 | 11/2001 | Shear et al. |
| 2001/0052077 A1 | 12/2001 | Fung et al. |
| 2002/0015444 A1 | 2/2002 | Suzuki et al. |
| 2002/0035723 A1 | 3/2002 | Inoue et al. |
| 2003/0033254 A1 | 2/2003 | Tanaka |
| 2003/0033460 A1* | 2/2003 | King et al. ........... 710/100 |
| 2003/0061165 A1 | 3/2003 | Okamoto et al. |
| 2003/0115144 A1* | 6/2003 | Stefik et al. ........... 705/51 |
| 2003/0182233 A1 | 9/2003 | Mocek et al. |
| 2003/0217011 A1 | 11/2003 | Peinado et al. |
| 2004/0054629 A1 | 3/2004 | De Jong et al. |

FOREIGN PATENT DOCUMENTS

| | | |
|---|---|---|
| EP | 1120967 | 8/2001 |
| JP | 8-272746 | 10/1996 |
| JP | 20 01202088 | 7/2001 |
| JP | 2001-202088 | 7/2001 |
| JP | 2003-058453 | 2/2003 |
| JP | 2003-058660 | 2/2003 |
| JP | 2003-330560 | 11/2003 |
| JP | 2005-539308 | 12/2005 |
| KR | 1999-023495 | 3/1999 |
| KR | 2000-050143 | 5/2000 |
| KR | 2000-0050143 | 8/2000 |
| KR | 2001-0091988 | 10/2001 |
| KR | 2001 0091988 | 10/2001 |
| WO | 97/37477 | 10/1997 |
| WO | 0044119 | 7/2000 |

OTHER PUBLICATIONS

English Language Abstract of JP 2001-202088.
English Language Abstract of KR 2001-0091988.
English Language Abstract of KR 2000-0050143.
English language Abstract of Korean 2000-050143.
English language Abstract of Korean 2001-0091988.
English Language Abstract of JP 8-272746, Nov. 11, 1995.
English Language Abstract of JP 2003-058453, Aug. 10, 2001.
English Language Abstract of JP 2003-058660, May 27, 2002.
English Language Abstract of JP 2003-330560, May 15, 2003.
English Language Abstract of JP 2005-539308, Dec. 12, 2005.

* cited by examiner

INFORMATION CONVERTING APPARATUS

BACKGROUND OF THE INVENTION

1. Field of the Invention

The present invention relates to an information converting apparatus that converts contents of content and right information in accordance with right management functions of the user, and that, in particular, promotes the use of content distribution services and electronic ticket services.

2. Description of Related Art

In recent years, with the spread of the Internet, services such as distribution of music and image through the Internet have become common. In addition, commercial services that distribute music to mobile telephone terminals through mobile communication networks have also started. According to the above systems, content that is distributed is recorded into a memory card installed in the mobile terminal and then played through player functions of the mobile terminal. Or, the memory card in which the distributed content is recorded is attached to a dedicated audio player and a playback is performed using this.

In order to protect the copyright of the content, such systems may provide limitations (condition of use) that set limits against moving data recorded in one memory card to another memory card and that set limits on the number of times of checkouts, that is, the number of times the data recorded into a memory card can be copied onto another memory card. Terminals and memory cards used in such systems are provided with use right management (DRM: digital right management) functions for keeping to the condition of use, whereby the use of content is performed in compliance with the condition of use.

FIG. 1 is a configuration diagram schematically showing an example of a conventional content distribution system. This system comprises production unit 10 that produces content, distribution controller 11 that distribute the content, portal 12 that offers portal pages for content selection for a user, content controller 14 that obtains the content through network 13, and storage 15 that stocks the content.

Although not shown in the figure, production unit 10 comprises a content production terminal that executes the authoring of content and sets content use rights, and a content registering terminal that registers the produced content with the server. The content produced above is, for example, multimedia data and ticket data.

Distribution controller 11 comprises, again not shown in the figure, a delivery gateway server that performs the delivery of the registered content, and a sales clearing server that performs the selling of content and fee-charge processing.

Portal 12 is a platform server that performs membership authentication and offers portal pages. Network 13 is a PHS network and the Internet and such. Content controller 14 is a PHS terminal or PC with player functions and storage 15 is a recorder media such as an SD card.

In this system, production unit 10 first generates and transmits to distribution controller 11 content, right information that provides the condition of use of the above content, and catalogue information for portal pages (information such as the titles of songs and singers, in case the content is music). Here the contents of the right information is set in accordance with the DRM functions of content controller 14 and storage 15. For example, if storage 15 has function for counting the number of checkout times, the number of checkout times is set as the right information.

Distribution controller 11 then registers the catalog information with portal 12. The user accesses portal 12 through content controller 14, retrieves the songs that he wants to purchase from the portal screen, and thus makes a purchase. Meanwhile, the content the user purchased and its right information is downloaded to content controller 14 from distribution controller 11 via network 13, and content controller 14 stores the downloaded content and its right information in storage 15. Upon execution of the content, a playback of the content is performed in accordance with the right information, using content controller 14 or a dedicated playback apparatus.

Meanwhile, a great number of content distributors exist that provides music content, and the format of description of right information pertaining to content varies from supplier to supplier. Then, in order to cope with such variation in the format of description, the provision of a converting section in a PC (content controller) has been proposed (see JP,2001-202088,A) whereby right information described in a certain format is converted to a different format without changing the contents thereof. By providing such a converting section, several contents from respective suppliers can be handled on a PC while maintaining the protection of the copyright.

Of late, however, the subject matter of distribution content has been expanding to various types of content such as books, image, and software, while distributors have been respectively trying to discriminate the contents of services in order to promote their originality. Under the above circumstances, there has been a trend of diversification of content right information not only in description format but also in their actual contents.

Examples of the above limitations are as follows and vary depending on right information: the number of generation numbers that are allowed to copy content is limited; the term is limited such that content can be used from a certain date to another date; the term is limited such that content can be used for a certain number of days; and the cumulative hours of use and the cumulative number of times of use are provided.

With these new conditions of use thus provided, the production of terminals and recording mediums with compatible DRM functions comes forth. In such case, if a device such as a terminal or a recording medium with DRM functions then in current use cannot use content at all with new conditions of use such as above, or if a certain device with DRM functions set in accordance with certain services cannot use content from other services, the convenience of the content distribution system as well as the user's trust in the system will be lost. This is a problem that can destroy the seed of system development.

In addition, if the right information of content has become diversified and the DRM functions of content controllers and storages also diversify along with this, the following problem will come forth.

Unless the user has a clear idea what DRM functions his own content controller and storage have, making a right purchase of usable content from respective distribution services in an adequate manner is difficult. Even given identical storages, there are cases where content and services that can be used vary depending on the features of the content controller. It is furthermore extremely difficult to keep up with accurate understanding of diversified performance and functions of devices and performance and functions of combined devices Therefore, if there is content that the DRM function of the user's device does not support in the content displayed on a portal page, there is a threat that the user erroneously purchases content that he cannot use.

Furthermore, when the user attempts to make a purchase of a new content controller, he may fear that the new model may not support the content that he has stocked in storage up till then.

SUMMARY OF THE INVENTION

It is an object of the present invention to provide an information converting apparatus that enables enhancement of convenience on each of both sides that distribute and use content, under the conditions where use limitations intended for copyright protection as well as the diversification of the subject matter of on-line services have diversified.

First, terms will be defined. In the present specification, "repository" refers to a processing unit that processes information. For example, a production unit, a distribution controller, a portal, a content controller, and a storage are all each a repository (see FIG. 1). Next, particularly in the claims, "content" should be construed in a broad sense, covering not only music, image, and software, but also catalogue information and electronic tickets and the like.

According to an aspect of the present invention, an information converting apparatus comprises a first obtaining section that obtains right information of content that is transmitted from a repository at a transmitting end to a repository at a transmission destination, a second obtaining section that obtains capacity information of the repository at the transmission destination, a conversion section that converts the right information obtained by the first obtaining section, the conversion being based on the capacity information obtained by the second obtaining section and following a conversion policy, and a transmission section that transmits a result of the conversion by the conversion section to the repository at the transmission destination.

According to the above configuration, the right information of the content transmitted from the repository at the transmitting end to the repository at the transmission destination is subject to conversion based on conversion policy and in accordance with the capacity information (content right management capacity) of the repository at the transmission destination. As a result, even under the conditions where use limitations intended to protect the copyright of content have become diversified and the production of equipment and recording mediums with compatible DRM functions is in force, it is possible to expand the types of equipment and recording mediums and thus promote the use of content without causing damage to the copyright of content.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DESCRIPTION OF THE PREFERRED EMBODIMENT

Figure 1:
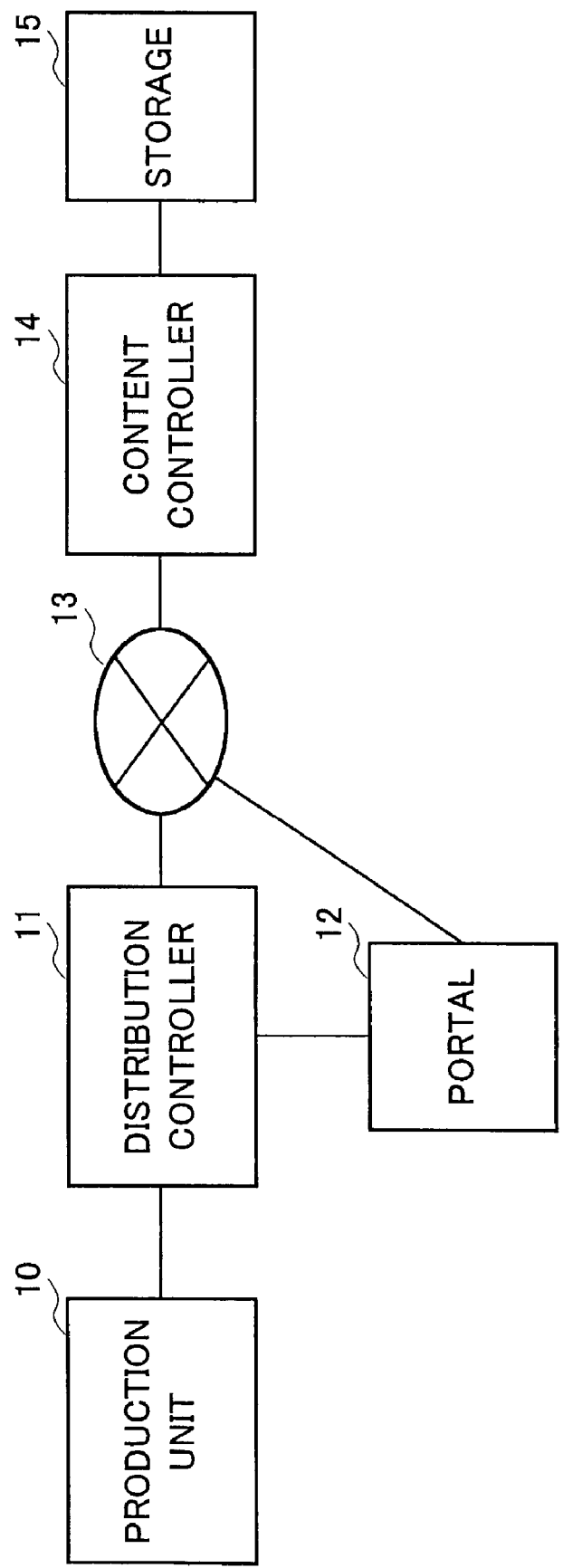
FIG. 1 is a configuration diagram showing an example of a conventional content distribution system.
Figure 2:
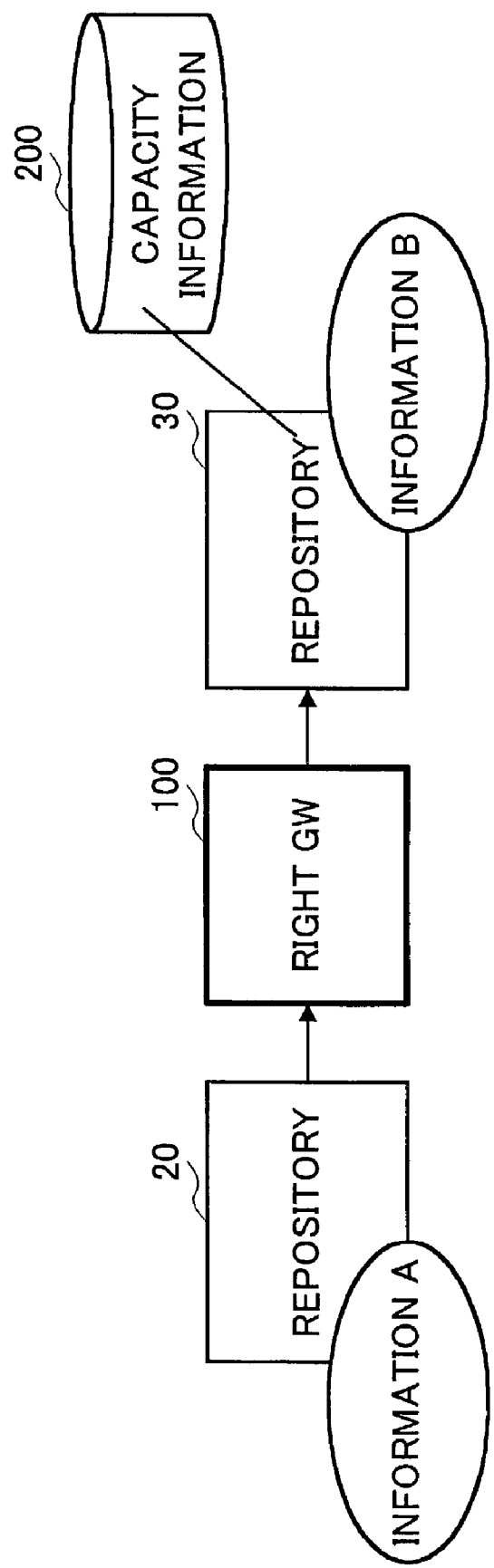
FIG. 2 is a basic configuration diagram of an information converting apparatus according to the present invention.

An information conversion system according to the present invention comprises, as shown in FIG. 2, right gateway (right GW) 100 as an information converting apparatus. Right gateway 100 processes information A (including at least one of content and content right information), processed in repository 20 at the transmitting end, in accordance with capacity information (performance and DRM functions) 200, and transmits the processing result to repository 30 as information B. Unless stated otherwise, content includes catalogue information; when content and catalogue information are noted separately, the content does not include the catalogue information.

Capacity information 200 of repository 30 to which right gateway 100 makes reference contains information such as schemes (what can and cannot be done through right management), in addition to information regarding hard and soft types (for example, the user agent, OS, version, browser, memory field, and DRM type).

Making reference to capacity information 200 such as above, right gateway 100 processes information A and generates information B based on conversion policy that provides direction of information conversion.

Conversion policy provides as to the way of changing the condition of use of content recorded in right information in accordance with the capacity information (right management capacity) of the repository at the transmission destination. For example, as a conversion policy, the conditions of use before and after conversion are provided for each right management capacity.

Examples of the description of conversion policy include, for instance, changes between different attributes, specifically, changes from one attribute "term" to another attribute "number of times, more specifically, changes from right information for limitation on term (condition of use before conversion) to right information for limitation on number of times (condition of use after conversion). In addition, right information conversion based on difference in communication means can be described in conversion policy as well.

It is also possible to provide, as a conversion policy, the way of converting content corresponding to right information according to the capacity of the repository of the transmission destination. In such case, for example, the method for converting content is provided to cope with the case where the condition of use of the content has changed.

Conversion policy is described in right information, or held inside right gateway 100 or in another apparatus to which right gateway 100 can make reference.

Based on conversion policy, right gateway 100 will:
(1) transmit information A without conversion;
(2) convert and transmit information A;
(3) when a number of pieces of information are included in information A, select and transmit one or several thereof; and
(4) not transmit.

Incidentally, when information A is transmitted converted, besides the methods whereby the rules provided by conversion policy are applied to automatically convert information A, such methods may be employed whereby the user is inquired as to conversion policy and based on the result thereof information A is converted, or where information A is converted based on the result of negotiation between repositories.

Figure 3A:
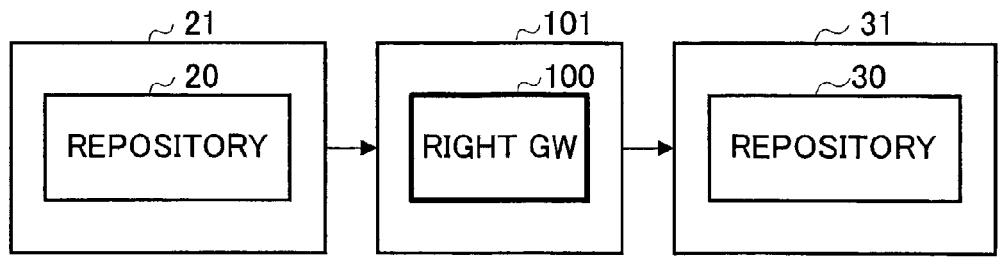
FIG. 3A shows an example of a physical configuration of the right gateway of FIG. 2.
Figure 3B:
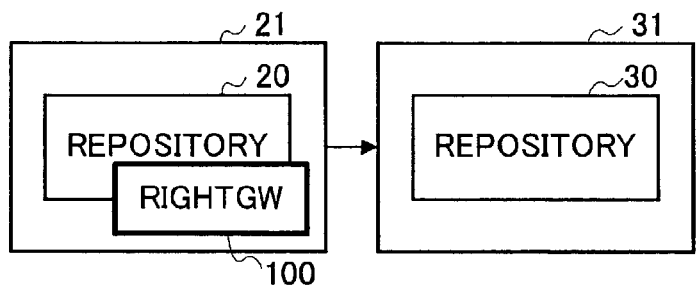
FIG. 3B shows another example of a physical configuration of the right gateway of FIG. 2.
Figure 3C:
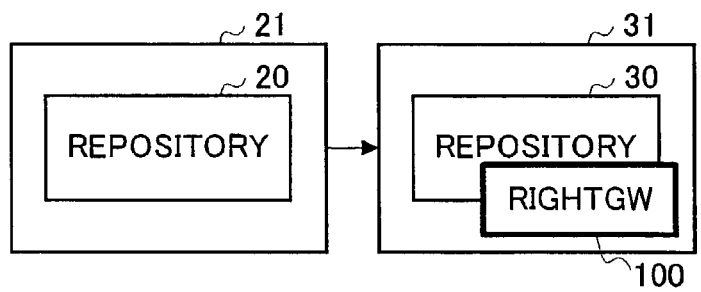
FIG. 3C shows yet another example of a physical configuration of the right gateway of FIG. 2.
Figure 3D:
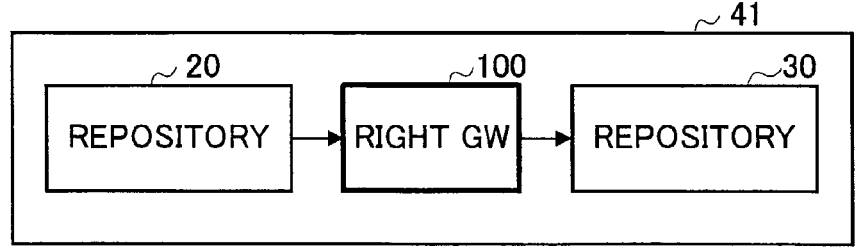
FIG. 3D shows yet another example of a physical configuration of the right gateway of FIG. 2.

In addition, as shown in FIG. 3A-FIG. 3D, right gateway 100 can physically exist on device 101 which is apart from respective repositories 20 and 30 (see FIG. 3A), on device 21 which is identical to repository 20 at the transmitting end (see FIG. 3B), on device 31 which is identical to repository 30 at the transmission destination (see FIG. 3C), and on device 41 which is identical to repository 20 at the transmitting end and repository 30 at the transmission destination (see FIG. 3D).

Figure 4:
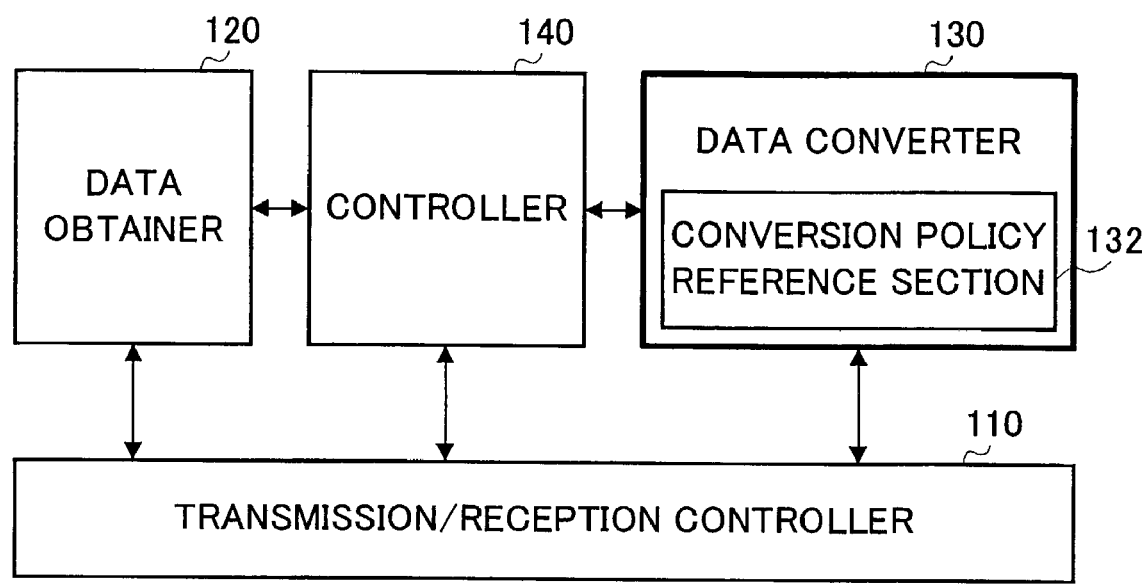
FIG. 4 is a block diagram showing an example of a basic configuration of the right gateway of FIG. 2.

As shown in FIG. 4, right gateway 100 comprises, in its basic configuration, transmission/reception controller 110 that controls data transmission/reception, data obtaining section 120 that obtains content (including catalogue information) and right information and the like from the repositories, data converter 130 that converts the content and the right information and the like following a conversion policy, and controller 140 that controls the operation of all parts of the right gateway. Data converter 130 comprises conversion policy reference section 132 that makes reference to the conversion policy. The above functions of all parts are realized upon carrying out processing provided by programs in computer.

Figure 5:
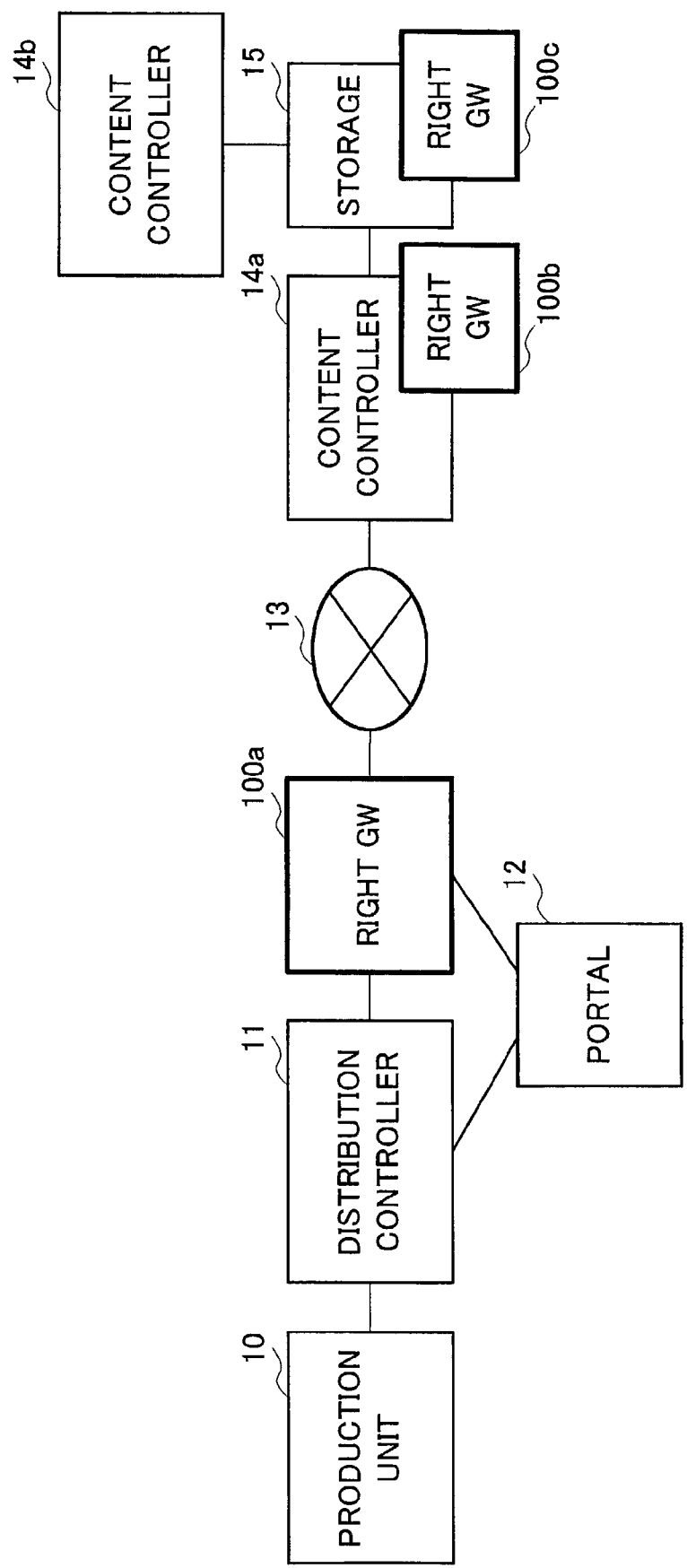
FIG. 5 is a configuration diagram showing an example of a content distribution system equipped with a right gateway.

FIG. 5 shows examples of positions where a right gateway can be provided in a content distribution system. Right gateway 100a is provided apart from every repository and, based on the DRM functions of content controller 14a and storage 15, converts content that is to be distributed and right information, or converts catalogue information that is to be displayed on portal 12. Right gateway 100b is provided on content controller 14a and, when for instance checking out content from storage 15 to another storage, performs conversion necessary for the right information and content.

In addition, right gateway 100c is provided on storage 15 and, when for instance content stored in storage 15 through content controller 14a is played using another content controller 14b through content controller 14a, performs necessary conversion to the right information and content.

However, the content distribution system does not have to be provided with all right gateways 100a-100c, and accordingly, it is possible to provide only one or a number of right gateways 100a-100c. It is also possible to divide one right gateway 100 into several, each component element being a unit, and provide the respective parts on several repositories to make a multi-stage configuration.

Figure 6:
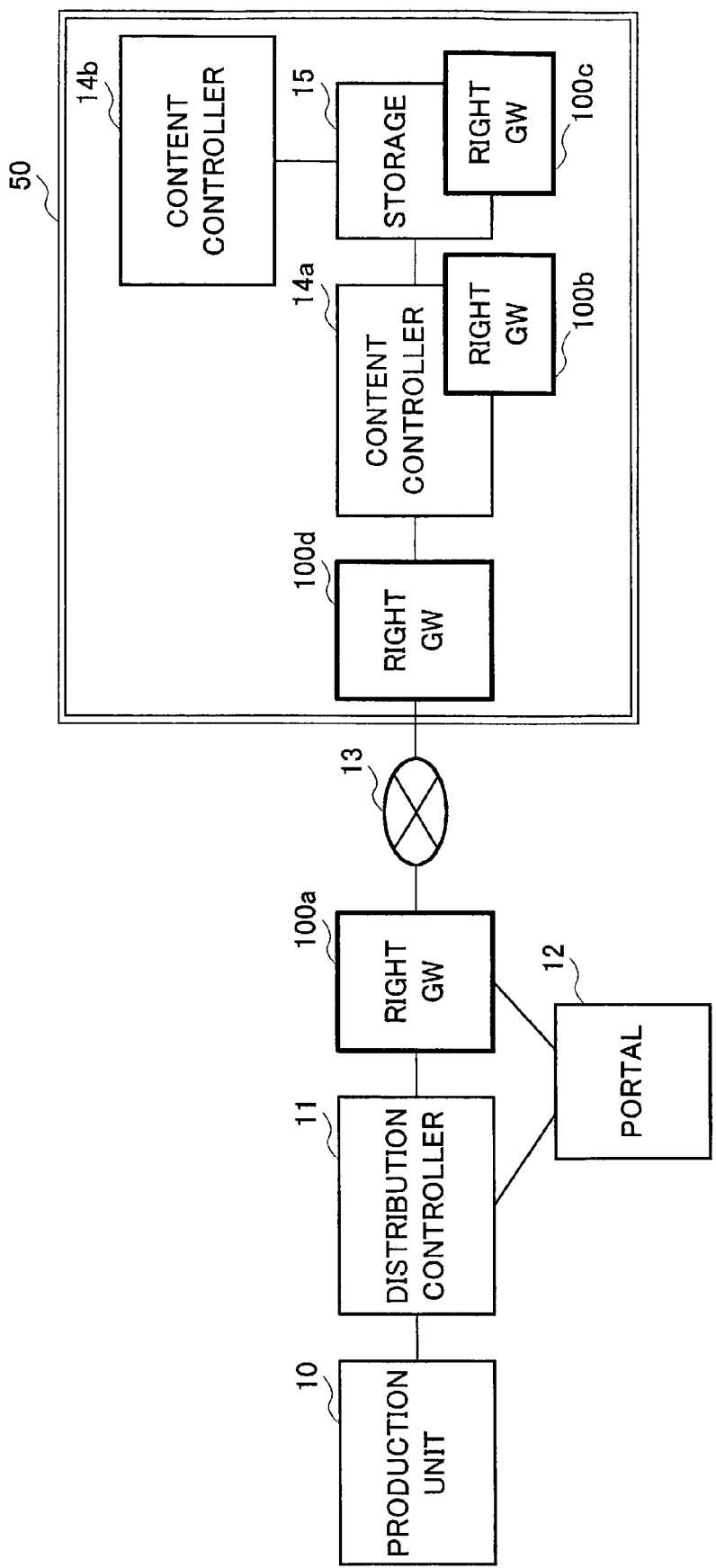
FIG. 6 is a configuration diagram showing another example of a content distribution system equipped with a right gateway.

In addition, FIG. 6 shows an example of providing right gateway 100d on home gateway of information appliance 50. This right gateway 100d is capable of substituting the functions of right gateways 100a, 100b, and 100c.

Moreover, the right gateway shown in FIG. 3D is in a configuration where a right gateway is provided on a recorder medium with a number of memory fields with varying DRM functions. This right gateway, when for instance content is moved from one memory filed to another memory field, performs necessary conversion to the right information and content.

Now, several embodiments will be explained below, each pertaining to the operation of a right gateway provided on a content distribution system.

Embodiment 1

With the first embodiment, the operation of a right gateway provided on a content controller will be explained.

Figure 7:
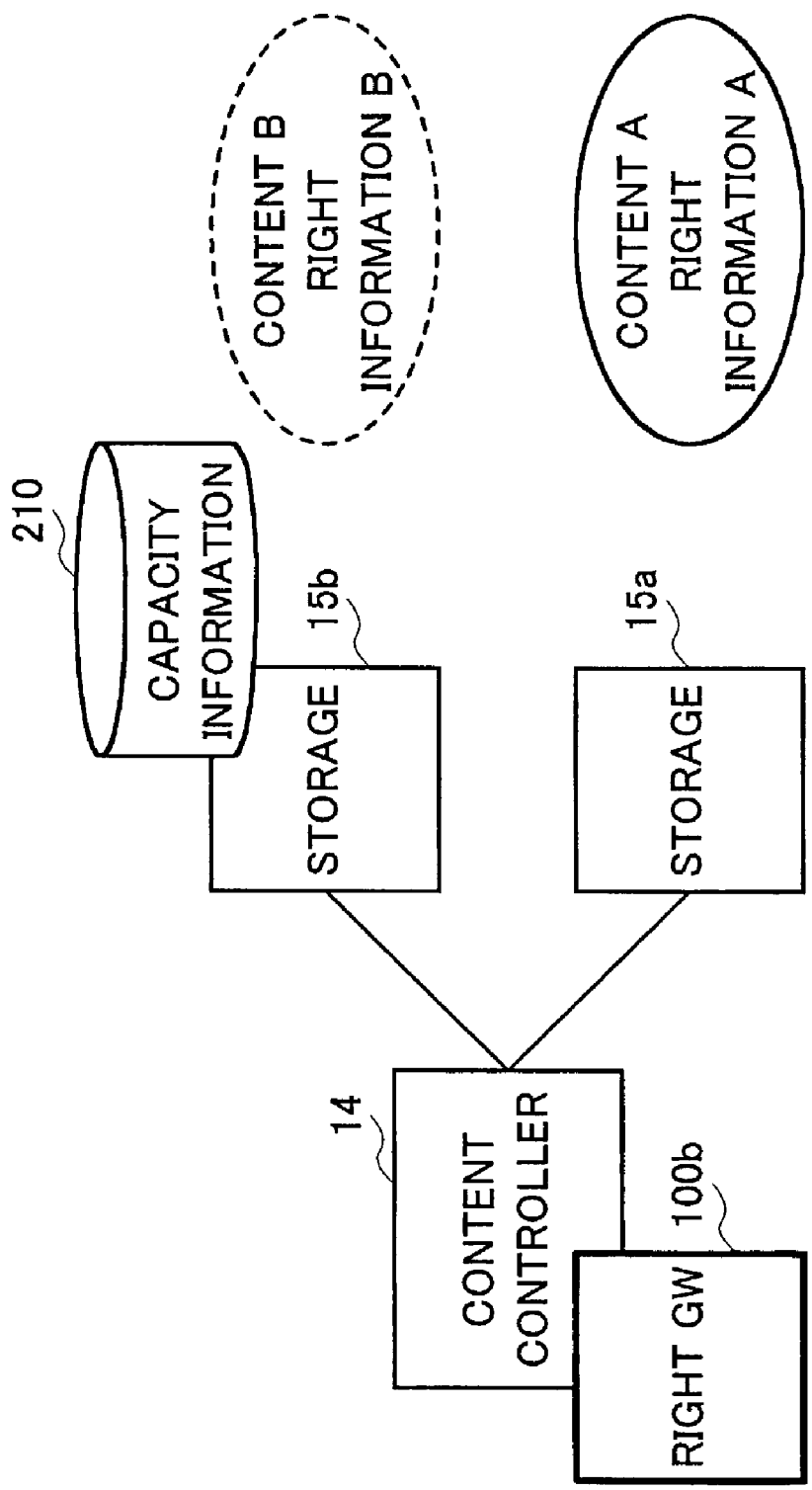
FIG. 7 is a core configuration diagram of a content distribution system (where the content controller is equipped with a right gateway) according to Embodiment 1 of the present invention.
Figure 8A:
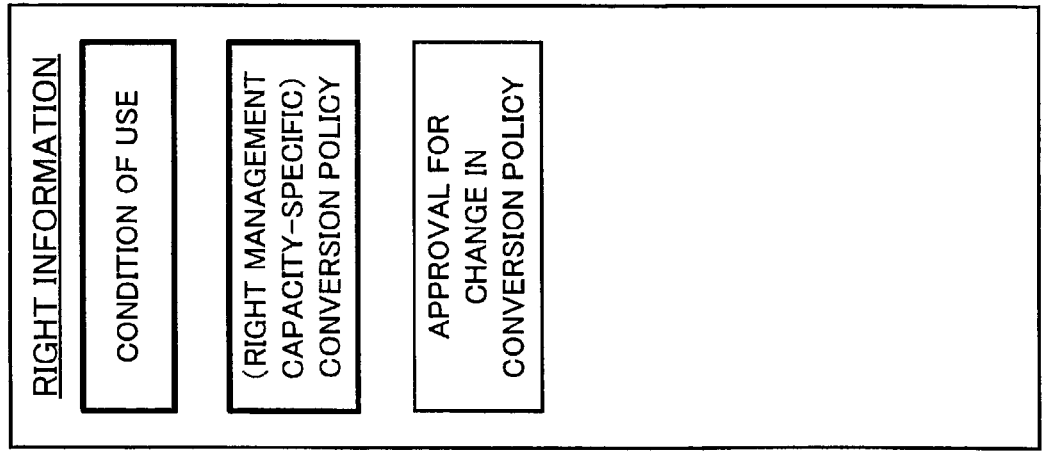
FIG. 8A shows an example of contents of right information.

As shown in FIG. 7, storage 15a stores content A and right information A. Initially, as shown in FIG. 8A, the following items are stored in the right information:
Condition of use: condition of use of content;
Right management capacity-specific conversion policy: provision that determines the types of content allowed for use and method of changing the condition of use in accordance with DRM capacity of repositories at the transmitting end; and
Approval for change in conversion policy: provision that allows a right gateway to revise conversion policy according to the right gateway's conversion processing capacity.

However, "approval for change in conversion policy" is not essential to right information.

Of the above items in right information, the condition of use is set in content production unit 10, while the conversion policy and the approval for change in conversion policy are set in distribution controller 11. Still, it is possible to set conversion policy as well as approval for change in conversion policy in production unit 10.

Figure 9:
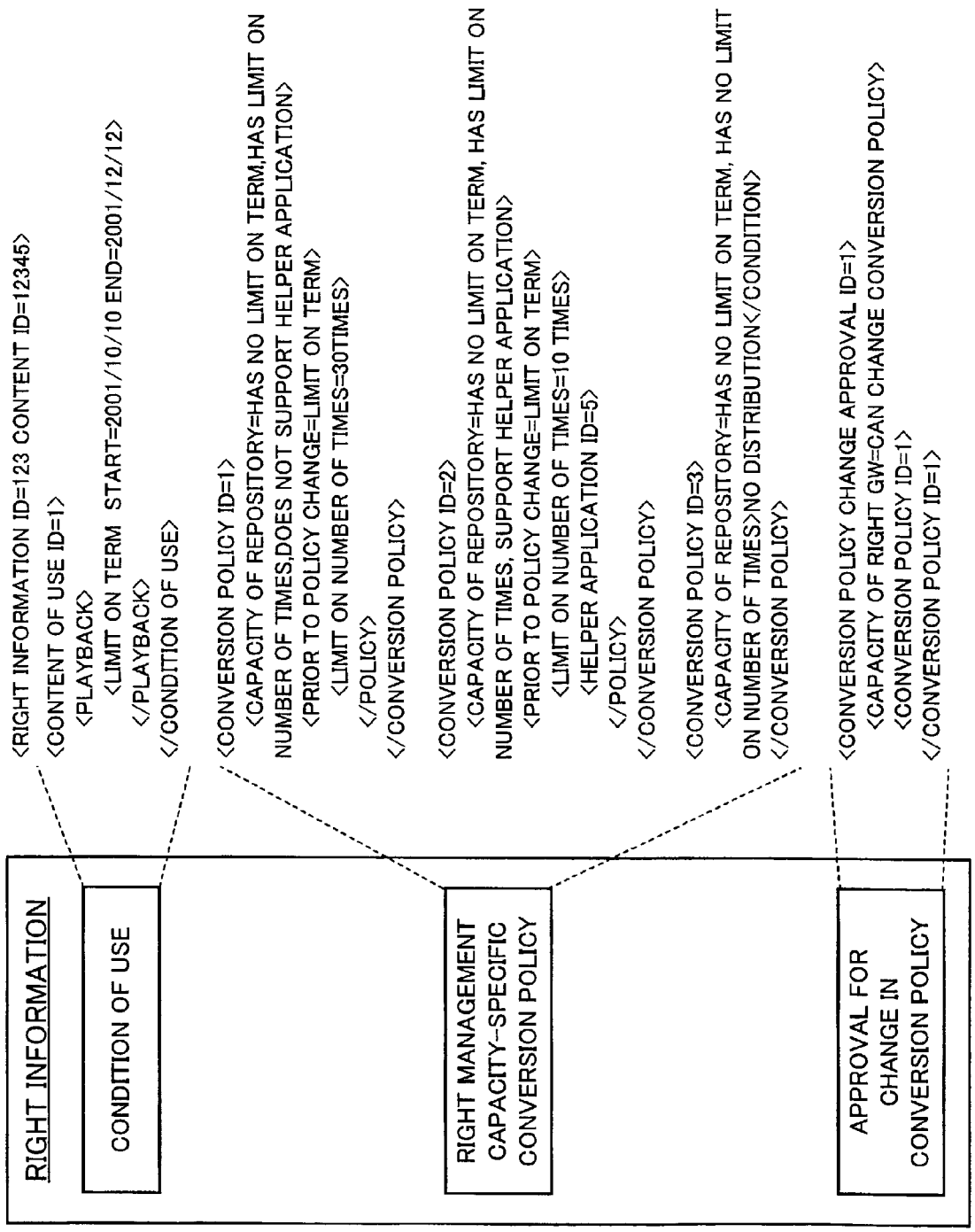
FIG. 9 shows an example of description of right information.

FIG. 9 shows a description example of right information.

In this example, the limit on term is set as a condition of use, where the term for playback is provided: "START=2001/10/10 END=2001/12/12."

Similarly, right management capacity-specific conversion policy provides that, in case of "CAPACITY OF REPOSITORY=HAS NO LIMIT ON TERM, HAS LIMIT ON NUMBER OF TIMES, DOES NOT SUPPORT HELPER APPLICATION" (in other words, having no DRM function to limit the term and unable to comply to the condition of use in respect to the playback term and yet having DRM function to limit the number of playback times, and unable to support application that, after a given specified number of playback times is fulfilled, re-specifies the number of playback times), the limit on term in the condition of use convert to "LIMIT ON NUMBER OF TIMES=30 TIMES." Furthermore, conversion policy may provide that, in case of "CAPACITY OF REPOSITORY=HAS NOT LIMIT ON TERM, HAS LIMIT ON NUMBER OF TIMES, SUPPORTS HELPER APPLICATION" (in other words, incapable of term management, yet having DRM capacity to limit the number of playback times and supporting application that, after a given specified number of playback times is fulfilled, re-specifies the number of playback times), the condition of use in respect to the limit on term convert to "LIMIT ON NUMBER OF TIMES=10 TIMES" and support application that re-specifies the number of playback times when the number of playback times reaches 10. Here, helper application refers to applications that provide later operations in the repositories at the transmission destination. Helper application is available from the repositories at the transmission destination through the methods described later.

Thus, upon re-specification of the number of playback times, if the term to allow playback provided by the condition of use is over, the limitation of the number of times will be set to 0 (zero), and if the term to allow playback is not over yet, similarly, re-specification of the playback times will be repeated until the term is over, thereby enabling limitation that suits the condition of use that provide the playback term.

Now, right gateway 100b on content controller 14, when checking out content A stored in storage 15a to another storage 15b, performs the following processing.

When the user performs checkout control to content controller 14, right gateway 100b obtains capacity information 210 of storage 15b through content controller 14.

Then, through content controller 14, right gateway 100b accesses content A and right information A in storage 15a, makes reference to capacity information 210 and right information A, performs conversion of the content and right information depending on need, and transmits the conversion result to storage 15b as content B and right information B.

For example, when the DRM functions of storage 15b provide "HAS NO LIMIT ON TERM, HAS LIMIT ON NUMBER OF TIMES, DOES NOT SUPPORT HELPER APPLICATION," the condition of use of right information is revised to "LIMIT ON NUMBER OF TIMES=30 TIMES" (that is to say, a license change is performed) and then sent to storage 15b.

On the other hand, when the DRM capacity of storage 15b says "HAS NOT LIMIT ON TERM, HAS LIMIT ON NUMBER OF TIMES, SUPPORTS HELPER APPLICATION," the condition of use of right information is converted to "LIMIT ON NUMBER OF TIMES=10 TIMES." Furthermore, a helper application is generated to re-specify the number of playback times after the number of playback times is fulfilled, and then added to the right information. These are sent to storage 15b.

Figure 8B:
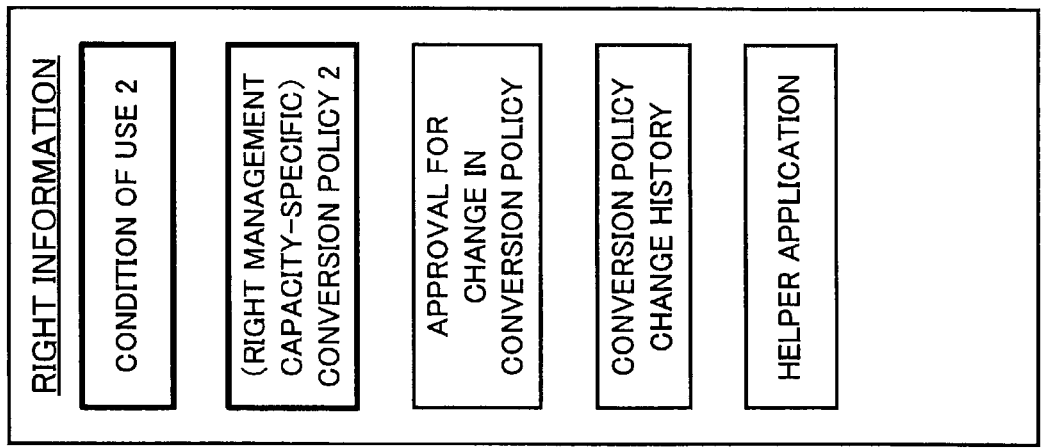
FIG. 8B shows another example of contents of right information.

FIG. 8B shows right information after conversion by right gateway 100b in the latter case of the above. "Condition of use 2" of the right information is one subjected to conversion processing by right gateway 100b in accordance with conversion policy and described as follows:

<PLAYBACK>
  <LIMIT ON NUMBER OF TIMES=10>
  <HELPER APPLICATION ID=5>
</PLAYBACK>

Also, "right management capacity-specific conversion policy" in FIG. 8A is described without change in "right management capacity-specific conversion policy 2" of the right information, and furthermore, when right gateway 100b given "approval for change in conversion policy" in the right information of FIG. 8A makes a change in this conversion policy, the changed conversion policy is described.

In addition, when right gateway 100b makes a change in conversion policy, this history is described in the right information as "conversion policy change history."

Here, a specific example of a right gateway to which approval for change in conversion policy is given is as follows: depending on the types of sales agents, for instance, right gateways under direct control of content production companies are given approval for change, whereas chain right gateways are not given such approval. Also, depending on the types of devices implemented with a right gateway, for instance, approval for revision may be given to a right gateway implemented on a secure chip. At all events, the history of change in conversion policy is kept so as to make clear which right gateway performed revision during the circulation process.

In addition, "helper application" is the helper application of "ID=5" generated by right gateway 100b and the body of this application is described into right information, or, the application ID and a URL to obtain this application are described in right information. In the latter case, the application body can be obtained through access to the URL.

Incidentally, of the items in right information, the ones other than "condition of use" are not essential to right information. However, if license conversion in a right gateway is to be made not only once but also continuously thereafter, "right management capacity-specific conversion policy 2" will be an essential item.

In case there is description in right information A that no content will be distributed to repositories that do not have right management capacity for term limitation, checkout processing to storage 15b will not be executed.

Moreover, in case there is description in the conversion policy of right information A that when "limit on term" converts to "limit on number of times," sound will be transmitted and yet no image will be transmitted or only certain meta-data will be sent out, filtering will be performed and specified data alone will be transmitted to storage 15b.

Furthermore, when "limit on term" converts to "limit on number of times" (on the premise that they are provided in the conversion policy of right information A), conversion may be performed to reduce the quality of sound.

In addition, link information will be added to the right information in such a way that content after conversion makes reference to the converted condition of use.

By thus providing, as right information conversion policy, approval for change in condition of use to a storage having no original right management capacity, and by having a right gateway that performs the revision of the condition of use following this conversion policy, it is possible to use a storage with different DRM functions (an old model, for instance) to checkout content.

Incidentally, storage 15a and 15b in FIG. 7 can be separate memory fields on a single memory medium.

In addition, helper application can be transmitted apart from right information to storage 15b.

Figure 8C:
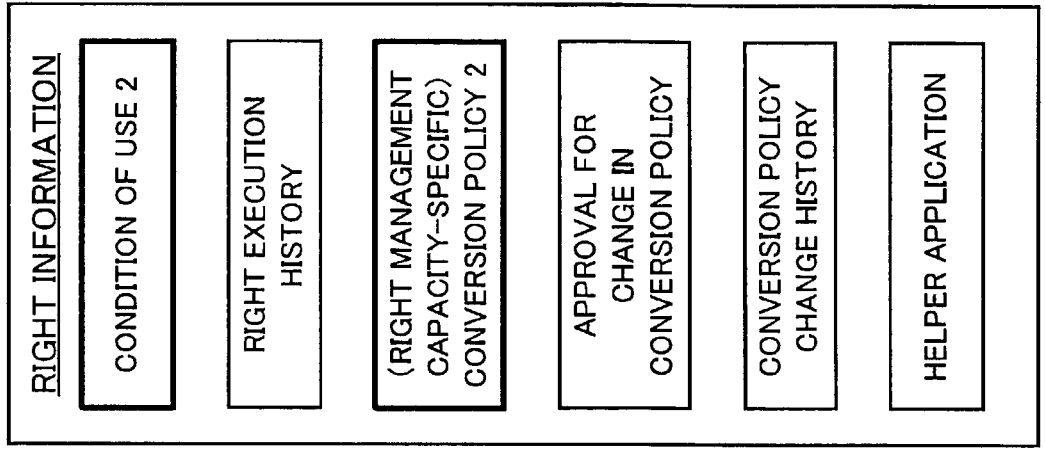
FIG. 8C shows yet another example of contents of right information.

Furthermore, when content is in use in accordance with "condition of use 2" of right information, a right gateway can record this into right information as "right execution history." FIG. 8C illustrates an example of right information in which "right execution history" is recorded. The following is a description example of "right execution history":

<EXECUTION HISTORY>
   <PLAYBACK TIME STAMP=2001/10/11 12:00 REPOSITORY ID=1>

:

</EXECUTION HISTORY>

Embodiment 2

With the second embodiment, the operation of a right gateway provided on storage will be explained.

Figure 10:
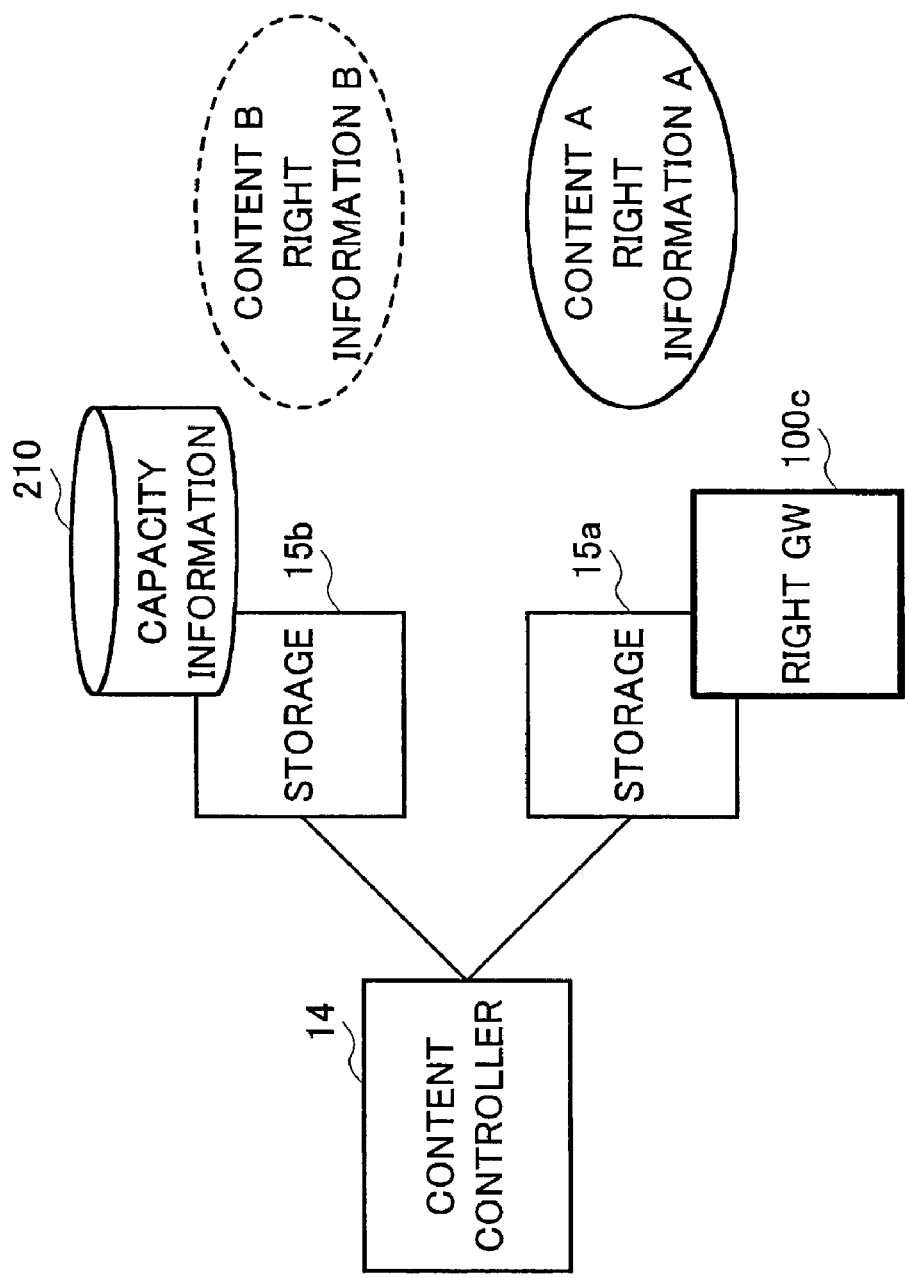
FIG. 10 is a core configuration diagram showing an example of a content distribution system (where the storage is equipped with a right gateway) according to Embodiment 2 of the present invention.

First, an explanation will be given with reference to FIG. 10 as to what operation is performed when right gateway 100c provided on storage 15a checks out content stored in storage 15a to another storage 15b through content controller 14.

When the user executes checkout control to content controller 14, content controller 14 obtains capacity information 210 of storage 15b and transmits it to storage 15a.

Then, making reference to right information A and capacity information 210 and based on the conversion policy of right information A, right gateway 100c on storage 15a converts content A and right information A according to need and transmits the conversion result to storage 15b as content B and right information B.

Figure 11:
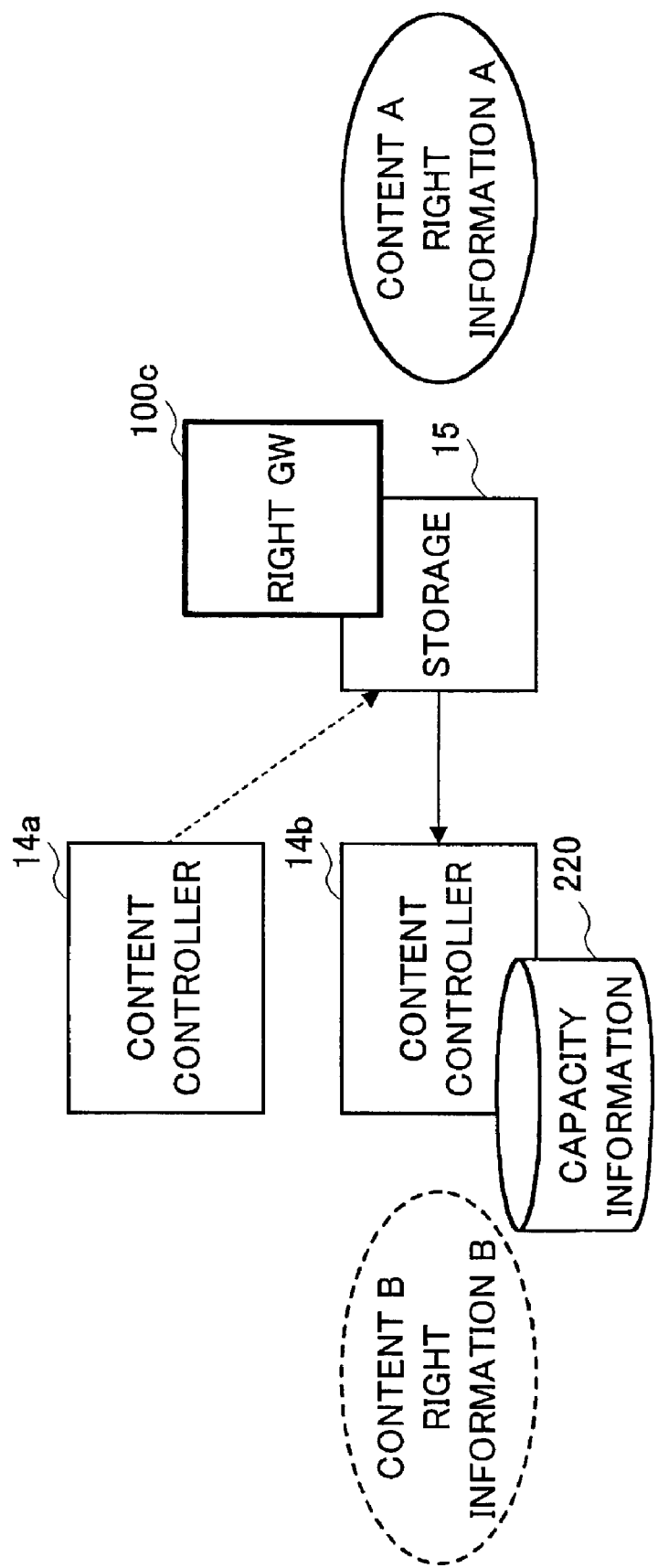
FIG. 11 is a core diagram showing another example of a content distribution system (where the storage is equipped with a right gateway) according to Embodiment 2 of the present invention.

Next, an explanation will be given with reference to FIG. 11 as to what operation is performed when right gateway 100c provided on storage 15 plays content stored in storage 15 on another content controller 14b via content controller 14a. Here, content controller 14a has DRM functions for limiting the number of times, whereas content controller 14b has DRM functions for time limitation alone.

When the user installs storage 15 to content controller 14b and executes playback control for content A, content controller 14b transmits capacity information 220 to storage 15.

Then, according to need, right gateway 100c on storage 15 makes reference to right information A and capacity information 220 and converts content A and right information A based on the conversion policy of right information A.

For instance, when there is limitation on the number of times in the condition of use of right information A and there is description in conversion policy that "in case execution is performed on a content controller incapable of limiting the number of times and yet capable of time limitation, the time limit will be three minutes," the condition of use of right information A converts to "time limit 3 minutes" and will be transmitted as right information B to content controller 14b with content.

Then, following the condition of use of right information B, content controller 14b will play content B for three minutes only.

By thus providing, as right information conversion policy, approval for change in condition of use to a storage and content controller having no original right management capacity, and by having a right gateway that revises condition of use following this conversion policy, it is possible to use a storage and a content controller with different DRM functions (an old model, for instance) to checkout or play content.

Embodiment 3

With this third embodiment, the operation of a right gateway that optimizes catalogue information displayed on portal pages will be described.

Figure 12:
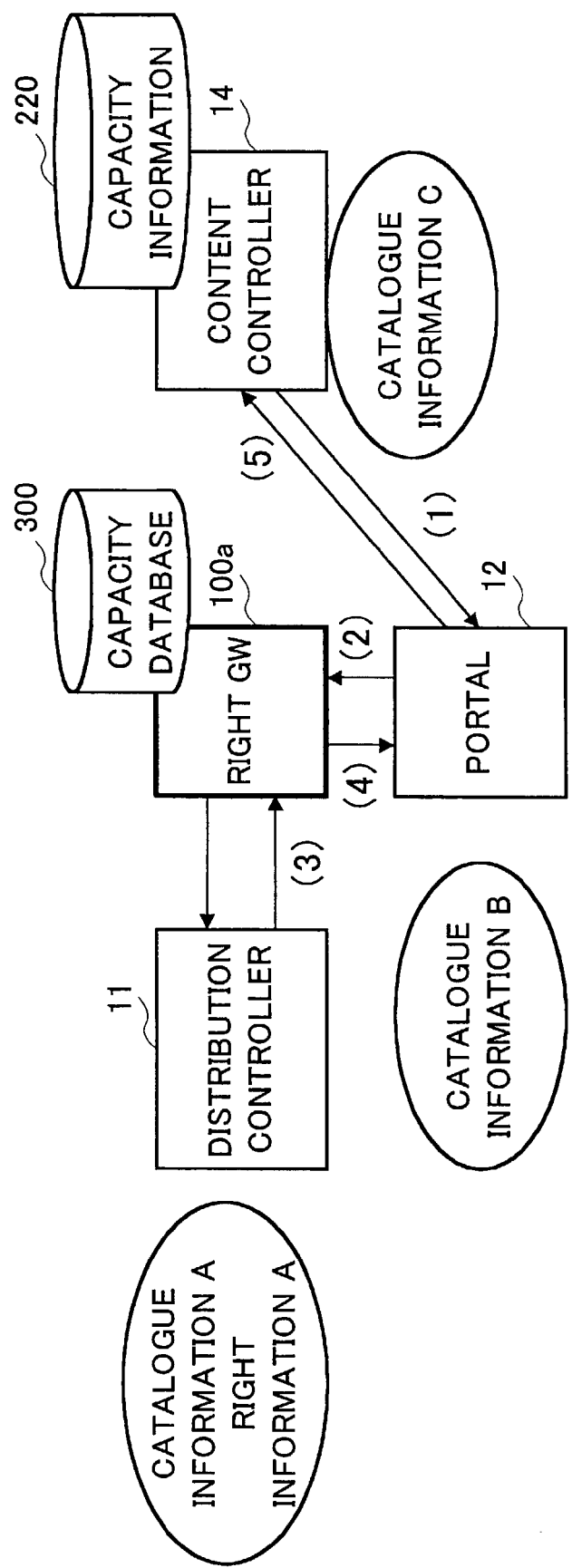
FIG. 12 is a core diagram showing an example of a content distribution system (a system intended for optimization of catalogue information) according to Embodiment 3 of the present invention.

This right gateway 100a is provided as a separate device as shown in FIG. 12 and furthermore comprises capacity database 300 that stores a capacity table whereby reference can be made as to downloading schemes and DRM functions using a repository's model number and such.

In order to learn which content can be distributed through its content distribution system, content controller 14 accesses portal 12 and transmits the capacity information of content controller 14 (1).

Then, portal 12 transmits the capacity information of content controller 14 to right gateway 100a (2).

Then, from distribution controller 11, right gateway 100a receives catalog information A of the content and right information A that can be distributed by the system (3).

Right gateway 100a decides as to whether content controller 14 has right management capacity compatible with either of the condition of use of right information A or the license-converted condition of use, and selects only the catalogue information of content compatible with right management capacity of content controller 14 and transmits it to portal 12 (4). Incidentally, right gateway 100a makes the above decision using DRM capacity information when the capacity information of content controller 14 contains information pertaining to DRM capacity, or by reading out DRM capacity information corresponding to the controller type from the capacity table of capacity database 300, if the capacity information of content controller 14 does not contain DRM capacity information.

Then, portal 12 presents to content controller 14 the catalog information sent from right gateway 100a (5).

As thus described, according to the present system, it is possible to present only the catalogue information of content that is valid to content controller 14 accessing portal 12.

Incidentally, by request from the user accessing portal 12, catalogue information can be presented without limitation added thereto such as above.

Figure 13:
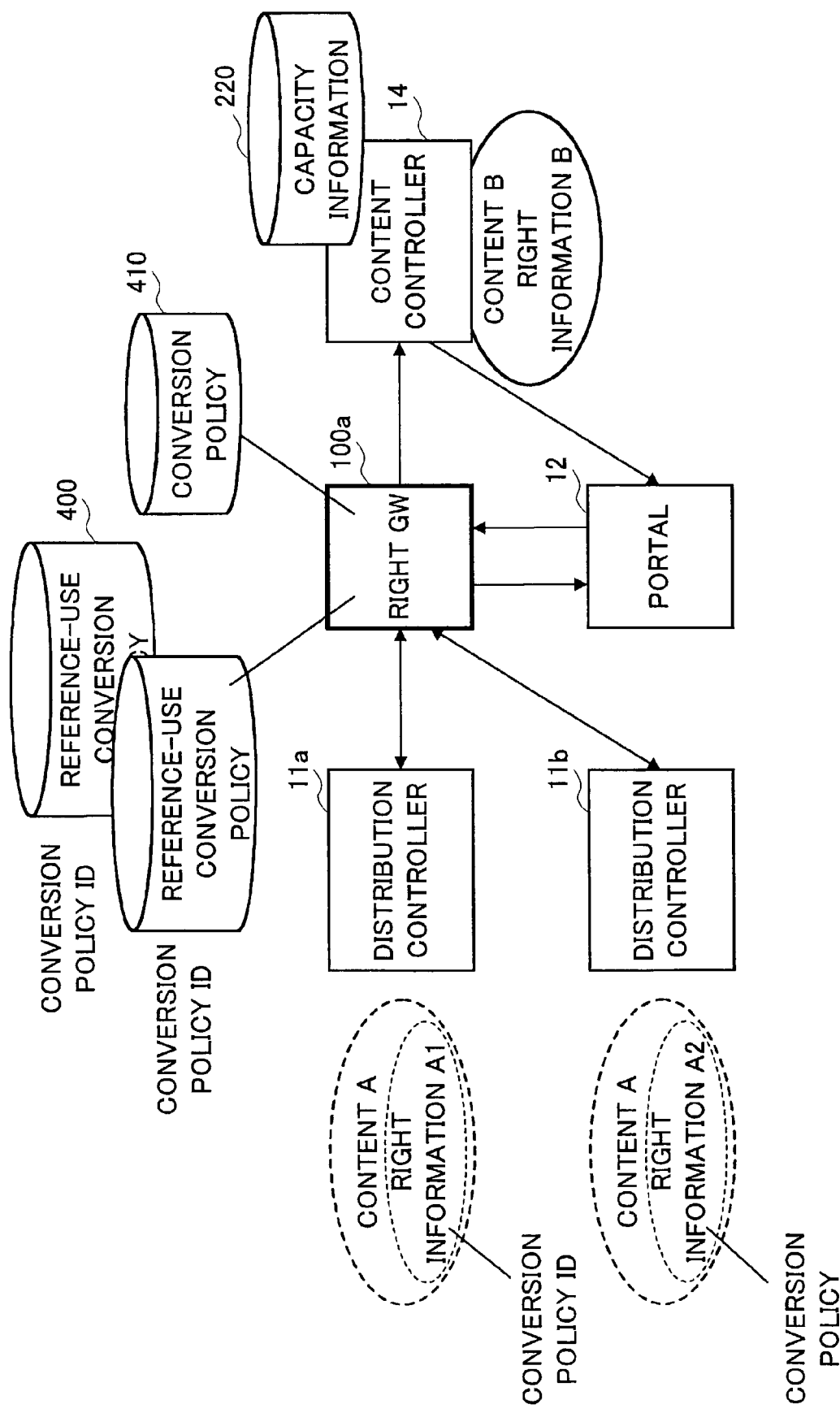
FIG. 13 is a core configuration diagram showing another example of a content distribution system (a system intended for optimization of catalogue information) according to Embodiment 3 of the present invention.

Moreover, conversion policy does not always have to be described in right information. For example, one distribution controller 11b in FIG. 13 holds right information A2 with conversion policy described therein, whereas distribution controller 11a at the other end holds right information A1 with only the conversion policy ID described therein. Right gateway 100a holds reference-use conversion policy 400 corresponding to respective conversion policy ID's and, upon receiving right information A1, reads out reference-use conversion policy 400 corresponding to the conversion policy ID described in this right information A1.

However, such configuration is also possible where no description is made into right information pertaining to conversion policy and right gateway 100a holds conversion policy 410.

Figure 14:
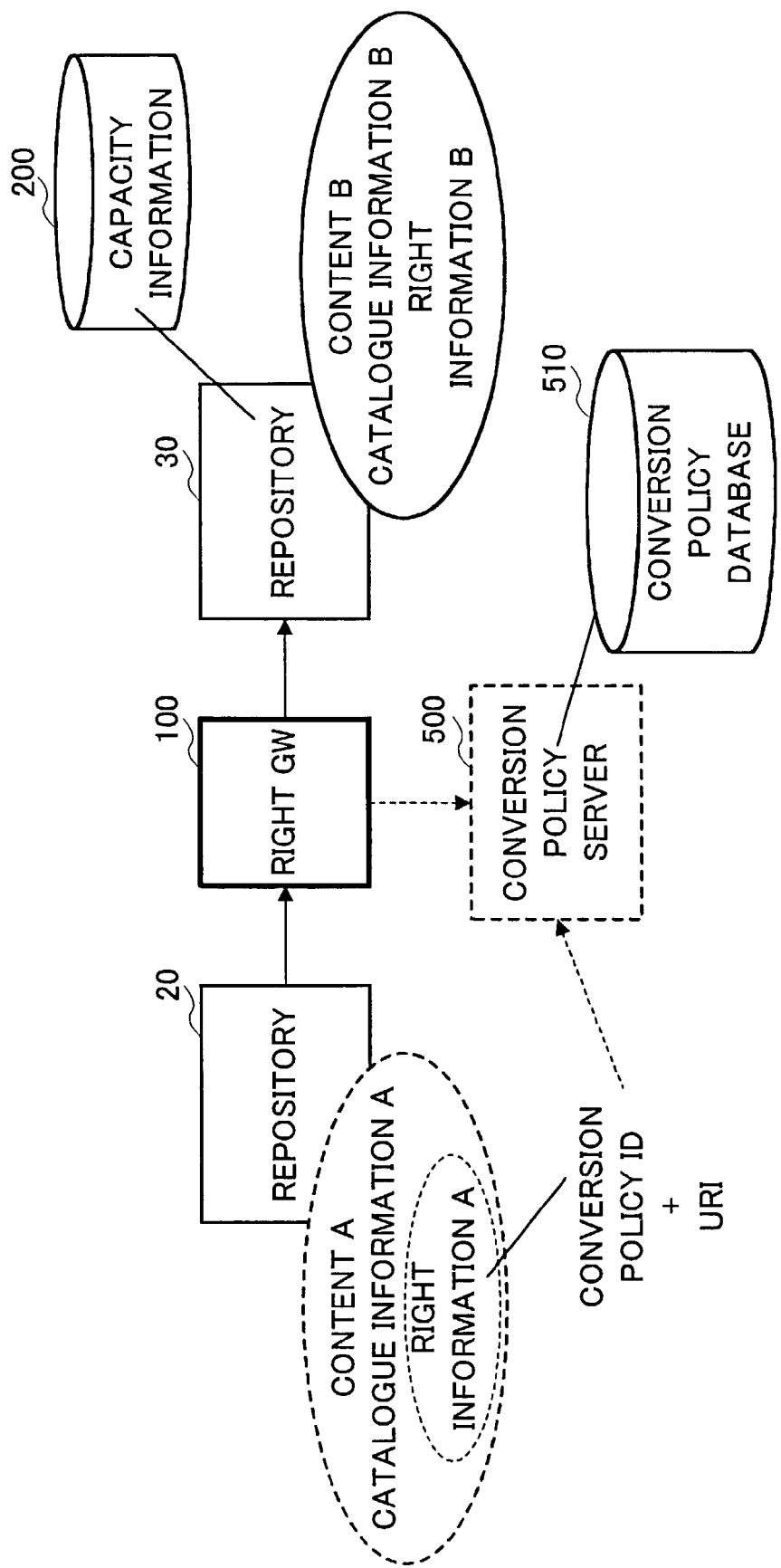
FIG. 14 is a core configuration diagram showing yet another example of a content distribution system (a system intended for optimization of catalogue information) according to Embodiment 3 of the present invention.

Moreover, as shown in FIG. 14, such configuration is also possible where conversion policy server 500 is provided additionally that contains conversion policy database 510 that stocks disclosed conversion policies and registered conversion policies, and right information contains a conversion policy ID and the URL of conversion policy server 500. Right gateway 100 that had received such right information can access conversion policy server 500 using the URL included in the received right information and obtain the conversion policy that corresponds to the conversion policy ID.

Embodiment 4

With this fourth embodiment, an explanation will be given in respect to a right gateway that performs user help service. In this context, user help service refers to services that response to various inquiries as to how to use a content controller and storage and the types of content that can be used therewith.

Figure 15:
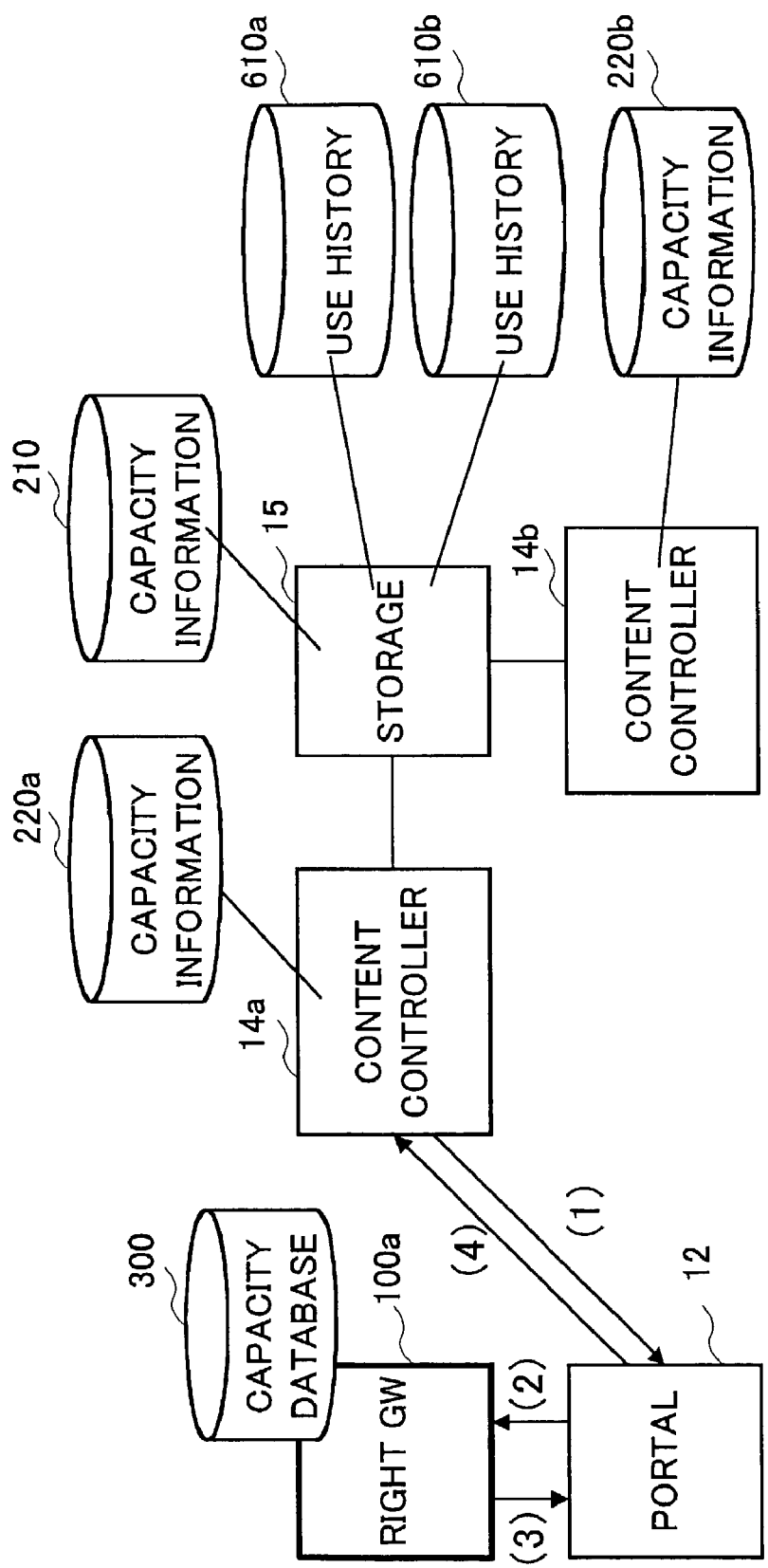
FIG. 15 is a core configuration diagram showing an example of a content distribution system (where user help service is in practice) according to Embodiment 4 of the present invention.

Assume that, as shown in FIG. 15, the user has content controller 14a, storage 15, and content controller 14b. Content controller 14a stores its own capacity information 220a, and content controller 14b stores its own capacity information 220b. In addition, storage 15 stores its own capacity information 210, capacity information 220b of content controller 14b, use history 610a of content controller 14a, and use history 610b of content controller 14b.

The user uses user help service when for instance he does not know what the most adequate distribution scheme to combine the content controller and storage he owns is, or when the user wants to purchase a new content controller and wants to know whether or not this content controller is capable of playing the content currently stored in the storage, or when the user wants to know which content controller is optimum for the content currently stored in the storage.

Meanwhile, content controller 14a uses storage 15 and accesses portal 12 and transmits, to portal 12, capacity information 220a of content controller 14a that content controller 14a holds, capacity information 210 of storage 15 that storage 15 holds, capacity information 220b of content controller 14b, use history 610a of content controller 14a, and use history 610b of content controller 14b (1).

Portal 12 then transmits the above capacity information and use history information to right gateway 100a (2).

Now, right gateway 100a has capacity database 300 that stores a capacity table on which capacity information of the repositories and services adequate thereto are described. When the capacity information of a repository and its use history information are sent from portal 12, right gateway 100a makes reference to the capacity table of capacity database 300 and provides content information appropriate to the user's need, based on the repository's capacity information or more than one of other repositories' capacity information that the repository holds and its use history (3).

Portal 12 then transmits to content controller 14a a reply such as follows: "Scheme 1 is optimum for your content controller 14a. However, in combination with storage 15, scheme 2 is recommended. Content controller 14b seems to have been in frequent use lately, and if so, scheme 3 is convenient." (4)

Moreover, as an additional service to portal 12, a service such as follows can be provided for a promotion of new products of content controllers: "You can execute all your content with the following new products. With the popular products below, the following content cannot be executed."

Figure 16:
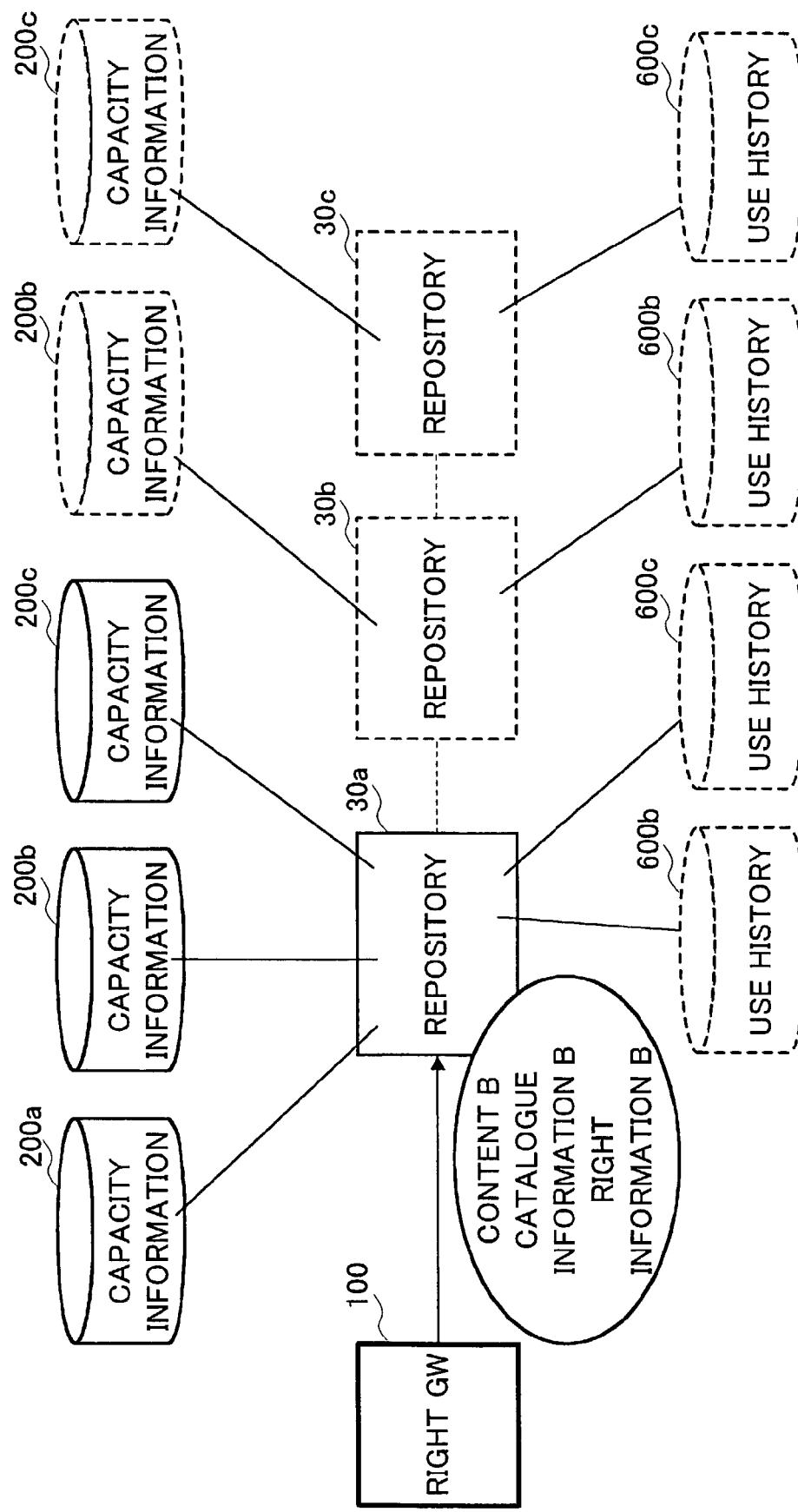
FIG. 16 shows a way of holding capacity information and use history for using user help service in a content distribution system (where user help service is in practice) according to Embodiment 4 of the present invention.

With such user help service, as shown in FIG. 16, repository 30a manages not only its own capacity information 200a but also capacity information 200b and 200c of other repositories 30b and 30c as well as use history 600b and 600c of the same, and by sending all these capacity information and use history to right gateway 100, right gateway 100 having capacity database 300 is able to provide adequate advise based on the capacity information and use history.

If repository 30a is a mobile telephone with a slot for a content storage medium or an electronic-ticket storing medium, the other repositories 30b and 30c are such as content-storing mediums, content players, electronic-ticket storing mediums. Moreover, if a repository 30a is a home gateway, the other repositories 30b and 30c are such as mobile telephones that support content stock or electronic ticket services, content stock media, content players, electronic ticket storage media, or mobile telephones with a slot for a content stock medium or an electronic ticket storage medium.

Embodiment 5

With the fifth embodiment, a content distribution system that uses a right gateway for content distribution will be explained.

Figure 17:
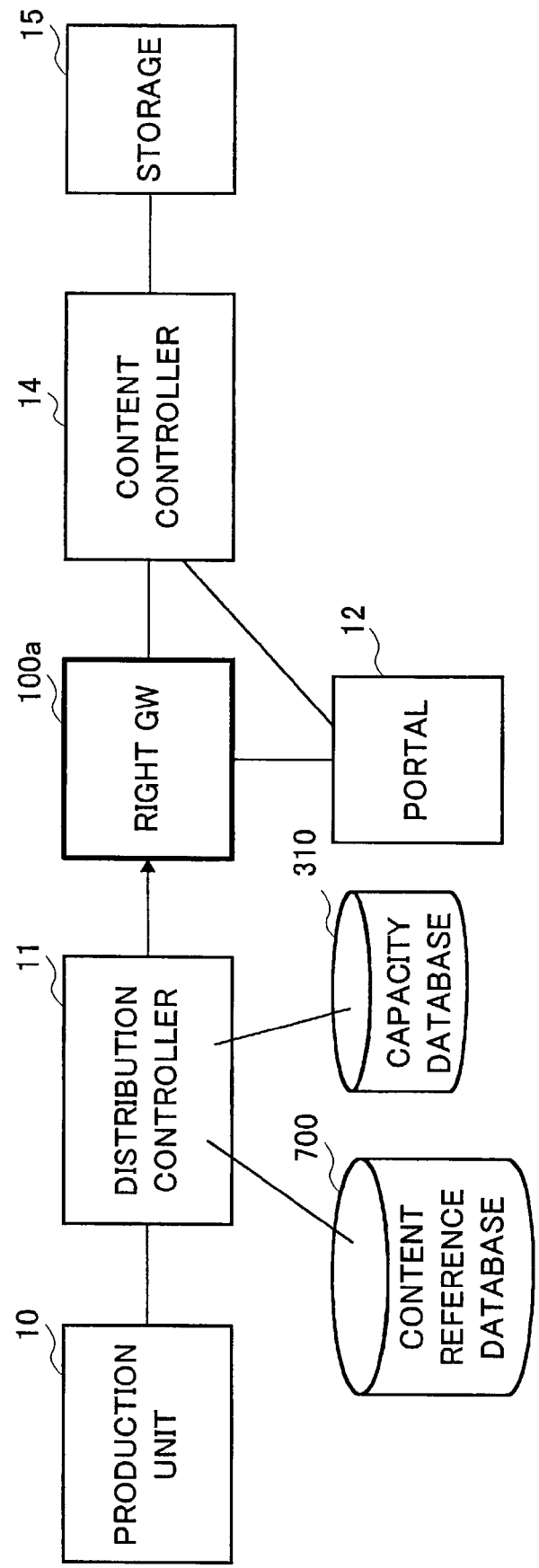
FIG. 17 is a configuration diagram showing an example of a content distribution system according to Embodiment 5 of the present invention.

In the distribution system shown in FIG. 17, distribution controller 11 comprises content reference database 700 that indicates the place to store content subject to distribution and capacity database 310 that stores a capacity table whereby reference can be made to DRM capacity from a repository's model number.

Upon receiving content from production unit 10, distribution controller 11 produces distribution content based on policy in distribution controller 11, holds the original produced distribution content by itself and sends a conversion request to right gateway 100a, and requests for conversion of the distribution content.

This conversion request includes:
Distribution content;
Format to be converted to (or right management performance, controller type, or storage type, to be converted to); and
Conversion policy set in distribution controller 11.

Then, right gateway 100a that received the conversion request converts the distribution content into the format of request and stores it.

In content reference database 700, content names, right management features necessary to use the content, and a place to store the distribution content are recorded. Consequently, in content reference database 700, distribution controller 11 is recorded as a storage for content that requires right management functions compatible with the condition of use of content set in production unit 10, and, right gateway 100a is recorded as a storage for content that requires right management functions compatible with the condition of use converted in accordance with conversion policy.

Then, distribution controller 11 transmits to portal 12 the distribution content information of the content then prepared for distribution.

Based on the received distribution content information, portal 12 renews the content that is to be put on the portal page.

When the user accesses portal 12 from content controller 14 and chooses content, portal 12 switches the connection from content controller 14 to distribution controller 11.

Then, by making a request to content controller 14 for capacity information or by making reference to DRM capacity that corresponds to the model number of content controller 14 by means of the capacity table of capacity database 310, distribution controller 11 checks the user's right management features.

From content reference database 700, distribution controller 11 performs a search for a storage of content with a content name that matches with the content name of the content the user chose and with right management features that match with the right management features of the user.

If, as a result of this search, the storage is distribution controller 11 itself, relevant distribution content is transmitted to content controller 14. On the other hand, if gateway 100a is the storage, the connection is switched from content controller 14 to right gateway 100a.

In the latter case, right gateway 100a retrieves the distribution content of the user's request from among the distribution content in storage and transmits it to content controller 14.

Figure 18:
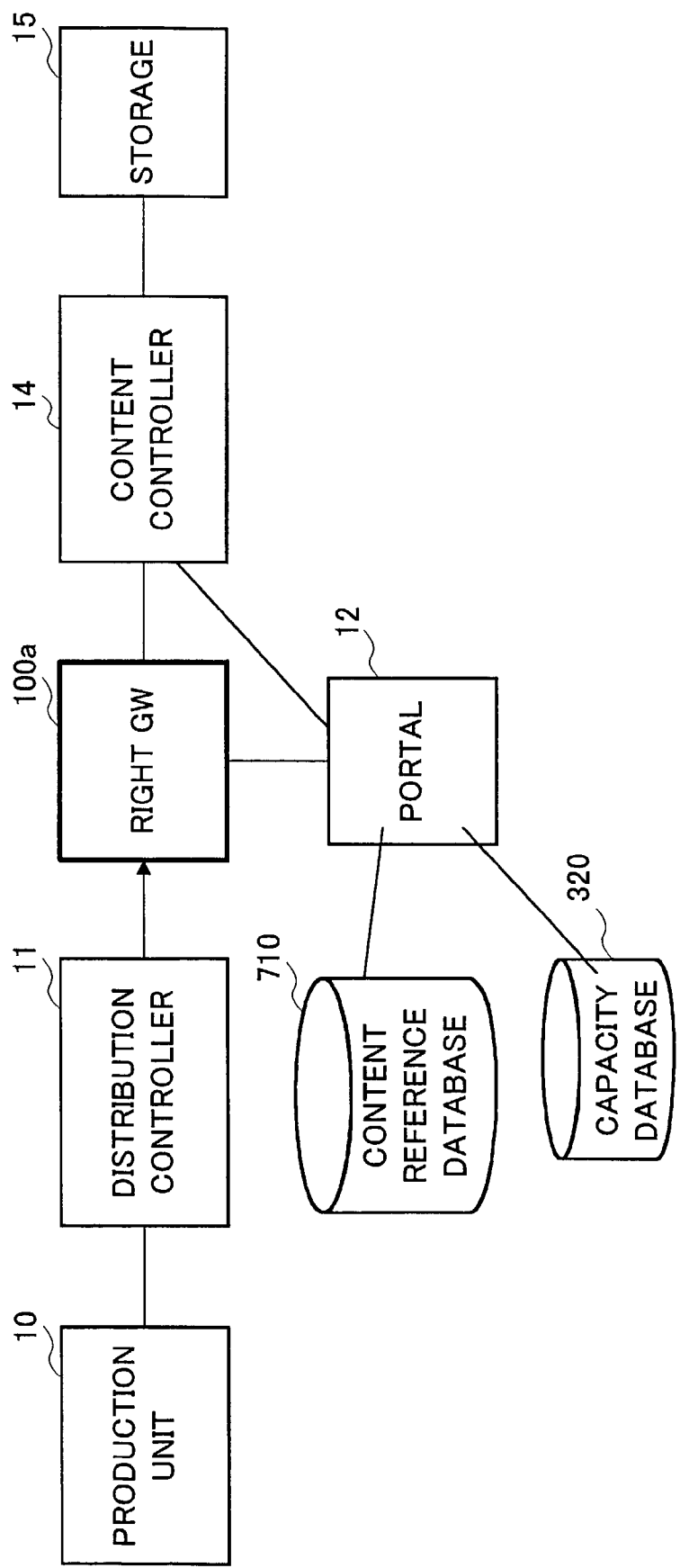
FIG. 18 is a configuration diagram showing another example of a content distribution system according to Embodiment 5 of the present invention.

Moreover, FIG. 18 illustrates a case where portal 12 comprises content reference database 710 and capacity database 320.

Upon receiving content from production unit 10, distribution controller 11 of this system produces distribution content based on policy of distribution controller 11, and holds the original produced distribution content by itself, while sending a conversion request to right gateway 100a and requesting conversion of the distribution content. The contents of the conversion request are identical with the case of FIG. 17. Distribution controller 11 registers the distribution content information with portal 12.

Right gateway 100a that received the conversion request converts and stores the distribution content in the format of request, and transmits the distribution content to portal 12.

Then, portal 12 receives and records the distribution content information into content reference database 710, while renewing the content to be put on the portal page based on the received distribution content information.

Then, when the user accesses portal 12 from content controller 14, portal 12 checks the user's right management features based on information such as the controller type and storage type obtained from content controller 14 using the capacity table of capacity database 300 and changes the content to be presented to the user into content that the user's right management features support.

The user selects content from the portal page, and portal 12 performs a search for the storage of content with a content name that matches with the content name of the content the user chose and with right management features that match with the right management features of the user, and switches the connection of content controller 14 to the searched out storage.

Distribution controller 11 or right gateway 100a that is connected with content controller 14 transmits the content requested from the user to content controller 14.

Figure 19:
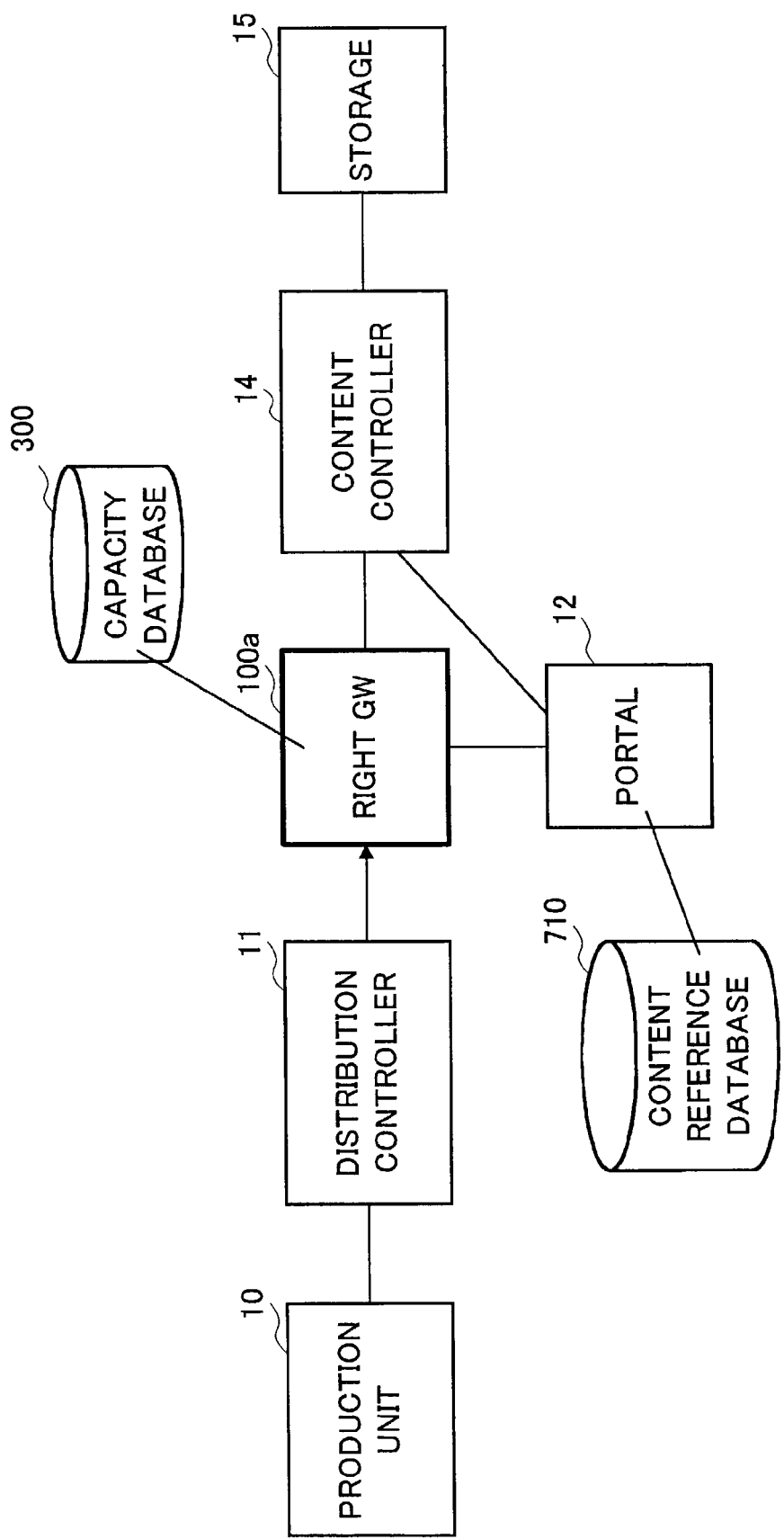
FIG. 19 is a configuration diagram showing yet another example of a content distribution system according to Embodiment 5 of the present invention.

In addition, FIG. 19 illustrates a case where right gateway 100a comprises capacity database 300 and portal 12 comprises content reference database 710.

Upon receiving content from production unit 10, distribution controller 11 of this system produces distribution content based on policy of distribution controller 11, and holds the original produced distribution content by itself, while sending a conversion request to right gateway 100a and requesting conversion of the distribution content. The contents of the conversion request is identical with the case of FIG. 17. In addition, distribution controller 11 registers distribution content information with portal 12.

Right gateway 100a that received the conversion request converts and stores the distribution content in a format in which the request for the distribution content was made, and transmits the content information to portal 12.

Then, portal 12 receives the distribution content information and records it into content reference database 710, while renewing the content to be on the portal page based on the received distribution content information.

Then, when the user accesses portal 12 from content controller 14, portal 12 sends information such as the controller type and storage type obtained from content controller 14 to right gateway 100a, and right gateway 100a, using the capacity table of capacity database 300, obtains and returns the right management features for these controller type and storage type to portal 12.

Portal 12 then changes the content to be presented to the user to content that the user's right management features support.

The user selects content from the portal page, and portal 12 performs a search for a storage of content with a content name that matches with the content name of the content the user chose and with right management features that match with the right management features of the user, and switches the connection of content controller 14 to the searched-out storage.

Distribution controller 11 or right gateway 100a that is connected with content controller 14 transmits to content controller 14 the content of the user's request.

Figure 20:
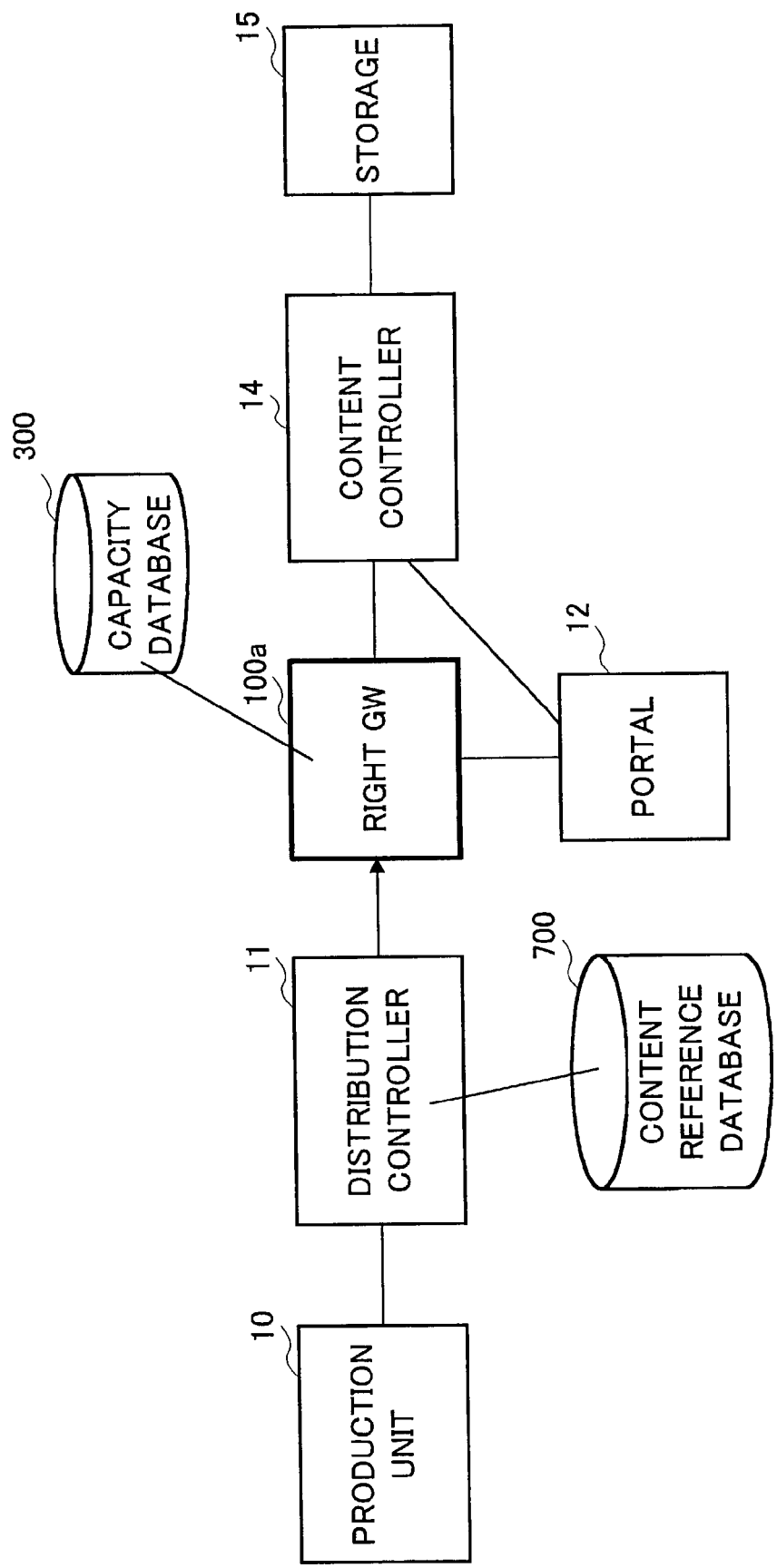
FIG. 20 is a configuration diagram showing yet another example of a content distribution system according to Embodiment 5 of the present invention.

Incidentally, as shown in FIG. 20, such configuration is also possible where right gateway 100a has capacity database 300 and distribution controller 11 has content reference database 700.

Thus, each of the above systems can add license policy of distribution controller 11 in addition to production unit 10's license policy, and as a result, it is possible to expand the types of content controller 14 and storage 15 that enable the use of content without causing damage to the copyright of content and to thus promote the use of content. Meanwhile, content creators will be free from the trouble of setting condition of use by taking into consideration the DRM features of content controller 14 and storage 15.

In addition, of the above systems, particularly the system of FIG. 18 where portal 12 is provided with content reference database 710 and capacity database 320 enables a quick response to content controller 14 that accesses portal 12.

On the other hand, the systems of FIG. 19 and FIG. 20 where content database 710, 700 and capacity database 300 are provided with separate apparatus enables dispersal of load.

One further variation is that a right gateway that receives a conversion request from a distribution controller and performs license conversion processing makes addition to license conversion rules based on the right gateway's policy. However, this does not apply if the right gateway is disallowed such operation by the production unit or by the distribution controller and such.

In addition, if there are several options in license conversion, the user (or controller) makes a choice through portal 12, distribution controller 11, or right gateway 100*a*.

In addition, through management of access history of content controller 14, right gateway 100*a* can convert to a license that allows several times of content downloading to content controller 14.

Moreover, right gateway 100*a*, by managing distribution to content controller 14, can convert to an active license that distributes content that is appropriate to the condition of content controller 14 and storage 15 at the time of access

Embodiment 6

With the sixth embodiment, the operation of a right gateway provided on a home gateway will be explained.

Figure 21:
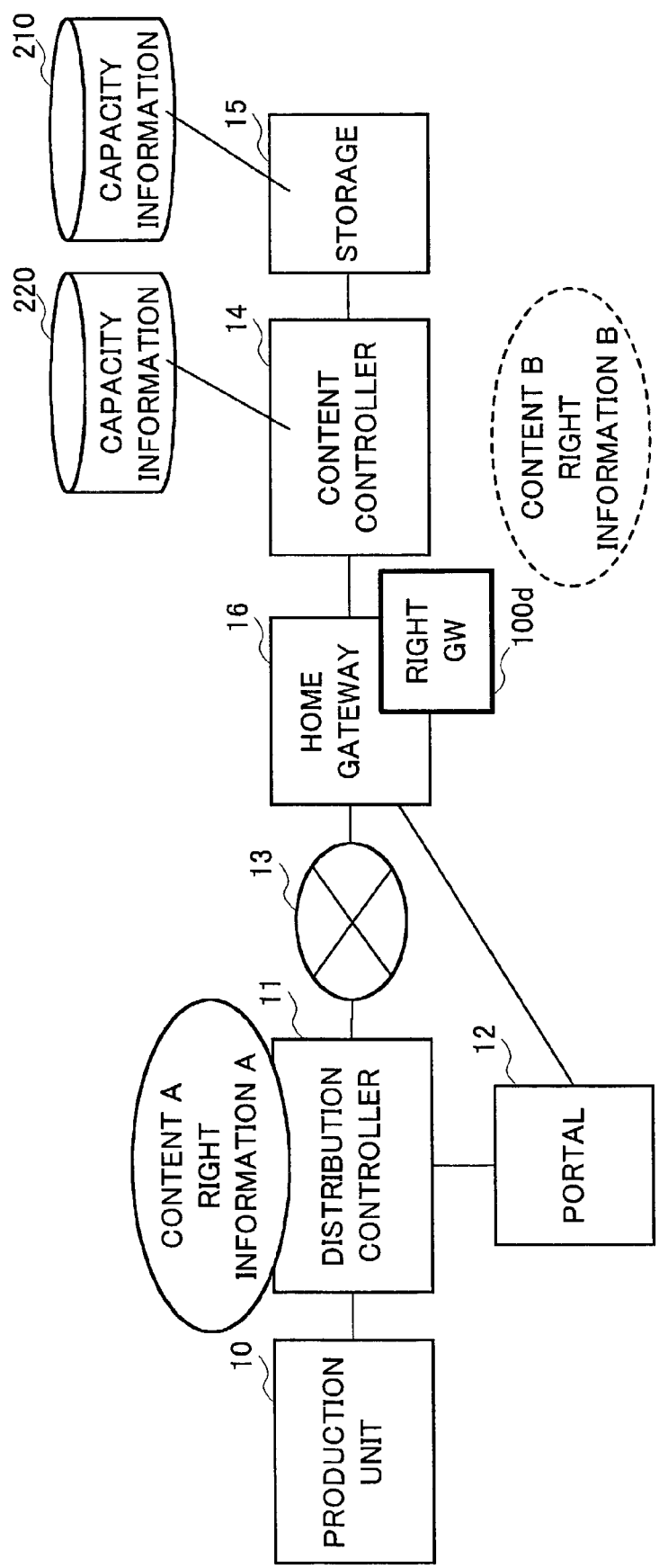
FIG. 21 is a configuration diagram showing an example of a content distribution system (where the home gateway is equipped with a right gateway) according to Embodiment 6 of the present invention.

First, an explanation will be given with reference to FIG. 21 as to what operation is performed when right gateway 100*d* provided on home gateway 16 downloads content from distribution controller 11 to content controller 14.

When the user executes downloading control through content controller 14, home gateway 16 downloads content A and right information A from distribution controller 11.

Then, by means of home gateway 16, right gateway 100*d* obtains capacity information 220 and 210 of content controller 14 and storage 15. Incidentally, there are cases where a database for information of household terminals is provided on home gateway 16.

Then, making reference to capacity information 220 and 210 and right information A, based on the conversion policy of right information A, right gateway 100*d* performs the conversion of content A and right information A according to need and transmits the conversion result to content controller 14 as content B and right information B.

Figure 22:
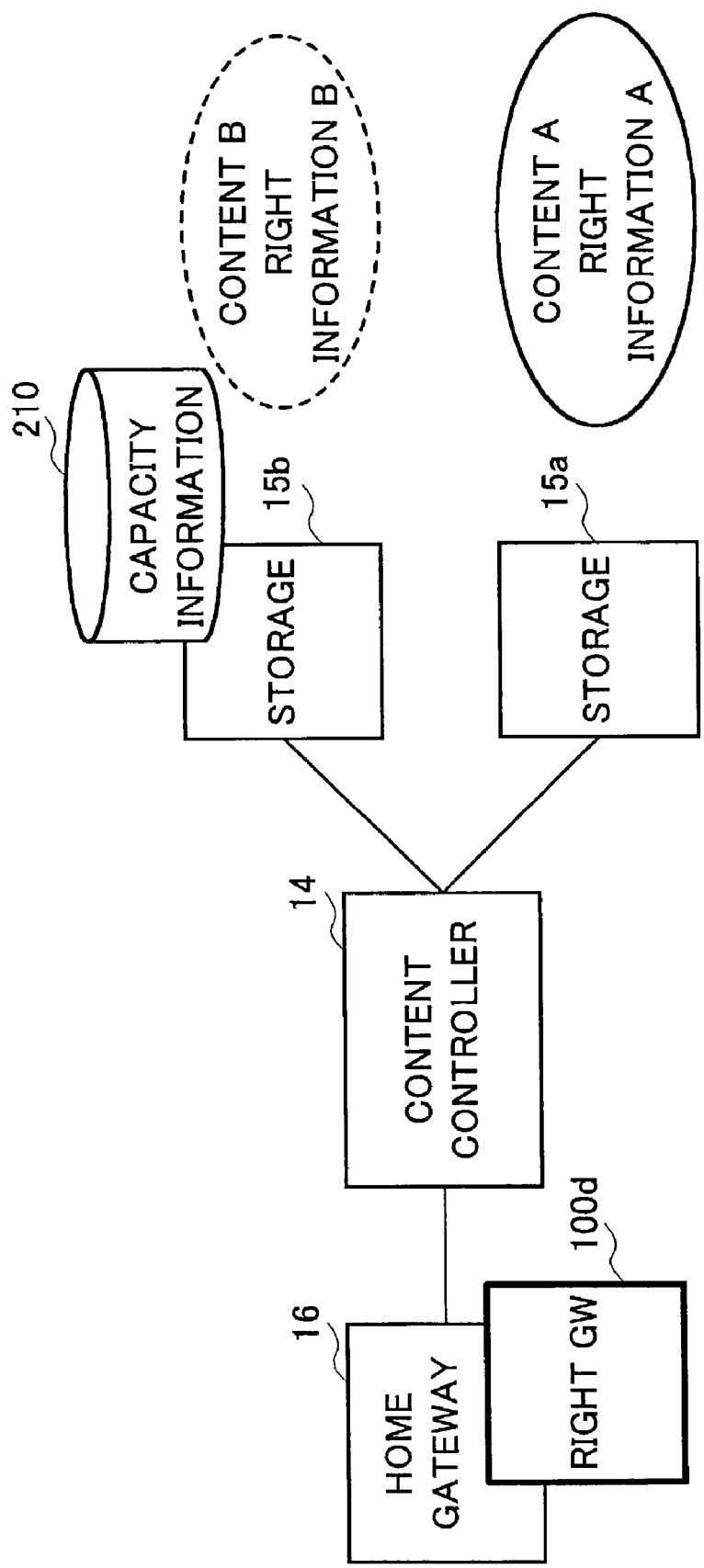
FIG. 22 is a core configuration diagram showing another example of a content distribution system (where the home gateway is provided with a right gateway) according to Embodiment 6 of the present invention.

Next, an explanation will be given with reference to FIG. 22 as to what operation is performed when right gateway 100*d* provided on home gateway 16 checks out content A stored in storage 15*a* to another storage 15*b*.

When the user performs checkout control to content controller 14, content controller 14 obtains capacity information 210 of storage 15*b*. Content controller 14 also accesses content A and right information A of storage 15*a* and transmits capacity information 210, content A, and right information A to home gateway 16. However, if home gateway 16 has an information database relating to household terminals, there is no need to transmit capacity information 210.

Then, making reference to capacity information 210 and right information A, based on the conversion policy of right information A, right gateway 100*d* on home gateway 16 performs the conversion of content A and right information A according to need and transmits the conversion result to storage 15*b* via content controller 14 as content B and right information B.

Thus, the provision of right gateway 100*d* with home gateway 16 enables home gateway 16 to smoothly control content downloading to information appliance and content checkout within information appliance.

Embodiment 7

With the seventh embodiment, the operation of a right gateway will be explained in respect to a case where, through peer-to-peer file exchange, content such as music or image is exchanged on a network on a person-to-person basis without a server.

Figure 23:
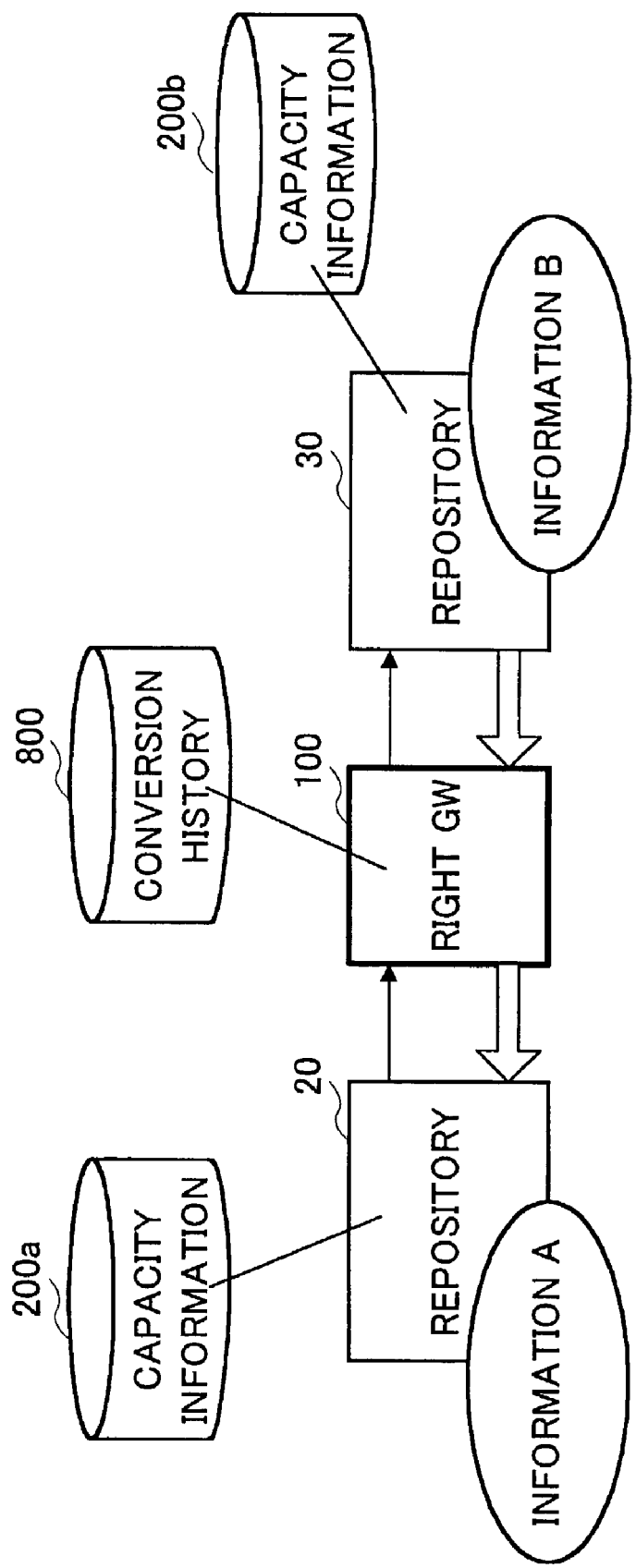
FIG. 23 is a core configuration diagram showing an example of a content distribution system (a peer-to-peer system equipped with a right gateway) according to Embodiment 7 of the present invention.

FIG. 23 illustrates a case where repository 20 and repository 30 perform bi-directional exchange of information (content (including catalogue information) and right information) through right gateway 100.

Upon transmission of information A (content (including catalogue information) and right information) from repository 20 to repository 30, right gateway 100 obtains capacity information 200*b* of repository 30 at the transmitting end and, after having made reference to the obtained capacity information 200*b* and the right information of information A and performed necessary conversion, transmits information A to repository 30. Meanwhile, right gateway 100 stores the conversion history.

Next, when transmitting information B from repository 30 to repository 20, right gateway 100 refers to past conversion history 800 and changes the conversion processing of information B (content (including catalogue information) and right information).

Provided that conversion from repository 20 to repository 30 has been performed several times, for instance, there will be a fee discount or a favorable right conversion (for instance, the term may be extended compared to normal or the number of times may be increased compared to normal) upon transmission from repository 30 to repository 20.

In addition, in case information is provided from repository 20 to repository 30 for free, there will no fee charge upon transmission from repository 30 to repository 20. In contrast, if information is provided from repository 20 to repository 30 for fee charge, fee will be charged upon transmission from repository 30 to repository 20.

Moreover, provided that conversion from repository 20 to repository 30 has been performed several times for fee charge and repository 20 has produced much profit, then, upon transmission from repository 30 to repository 20, there will be a fee increase or unfavorable right conversion (for instance, the term may be shortened compared to normal or the number of times may be reduced compared to normal).

Thus, according to the present embodiment, right gateway 100 enables well-balanced information exchange in peer-to-peer information exchange.

Embodiment 8

With the eighth embodiment, an explanation will be given in respect to a system that manages capacity information of respective repositories by means of a server.

Figure 24:
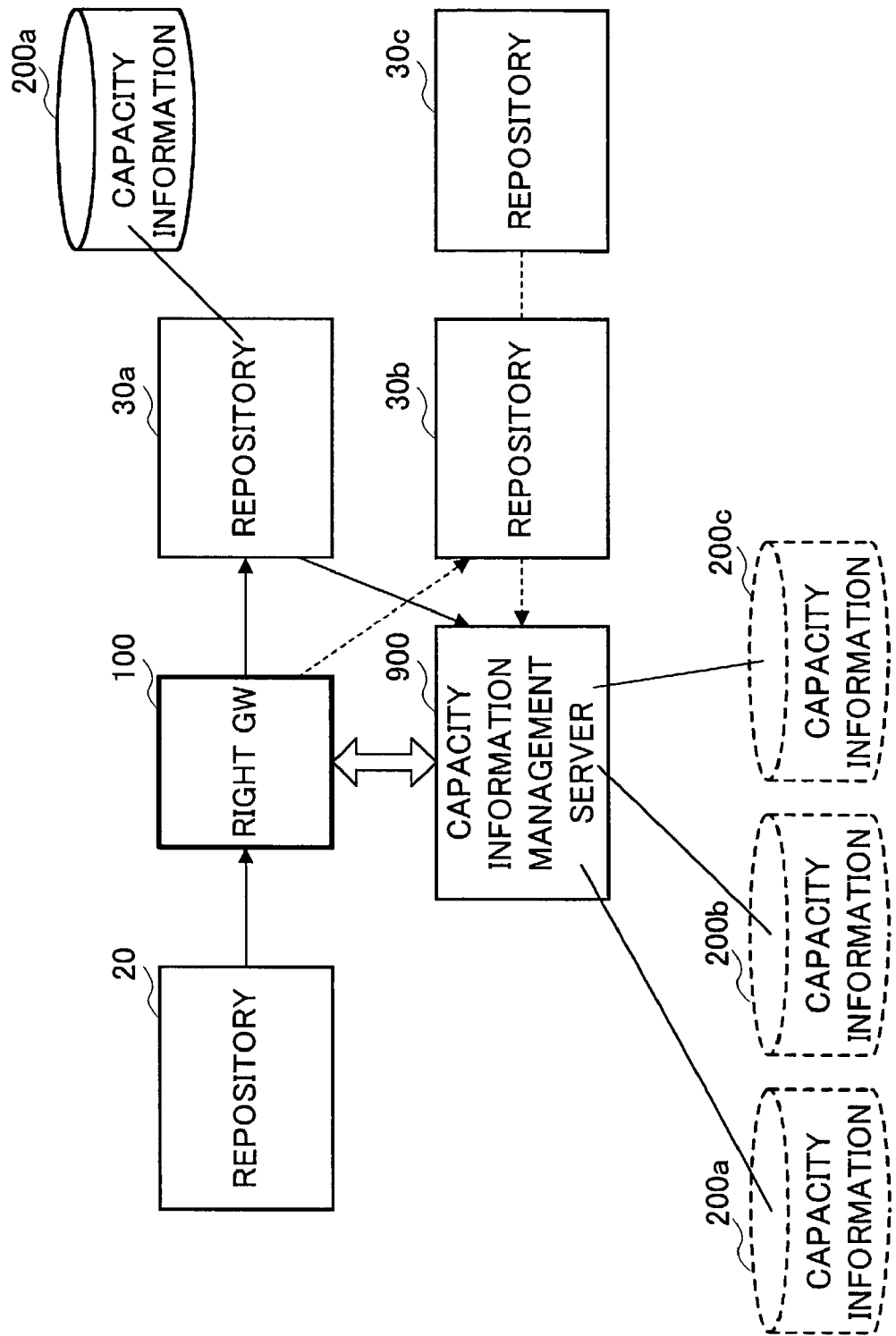
FIG. 24 is a core configuration diagram showing an example of a content distribution system (where a capacity information management server is provided) according to Embodiment 8 of the present invention.

As shown in FIG. 24, this system has capacity information management server 900 that manages capacity information of respective repositories.

For instance, when purchasing an apparatus, the user is able to register repository capacity information with capacity information management server 900. A repository with registered capacity information does not have to manage its own capacity information.

Upon transmission of information from repository 20 to repository 30a, right gateway 100 receives the ID of repository 30a from repository 30a at the transmission destination, accesses capacity information management server 900, and obtains the capacity information of repository 30a that corresponds to the ID of repository 30a.

Capacity information management server 900 can be provided with a right gateway, a portal, a distribution controller, or at any position on a repository.

Embodiment 9

With this ninth embodiment, an explanation will be given in respect to a system that uses personal information for license conversion at a right gateway.

Figure 25:
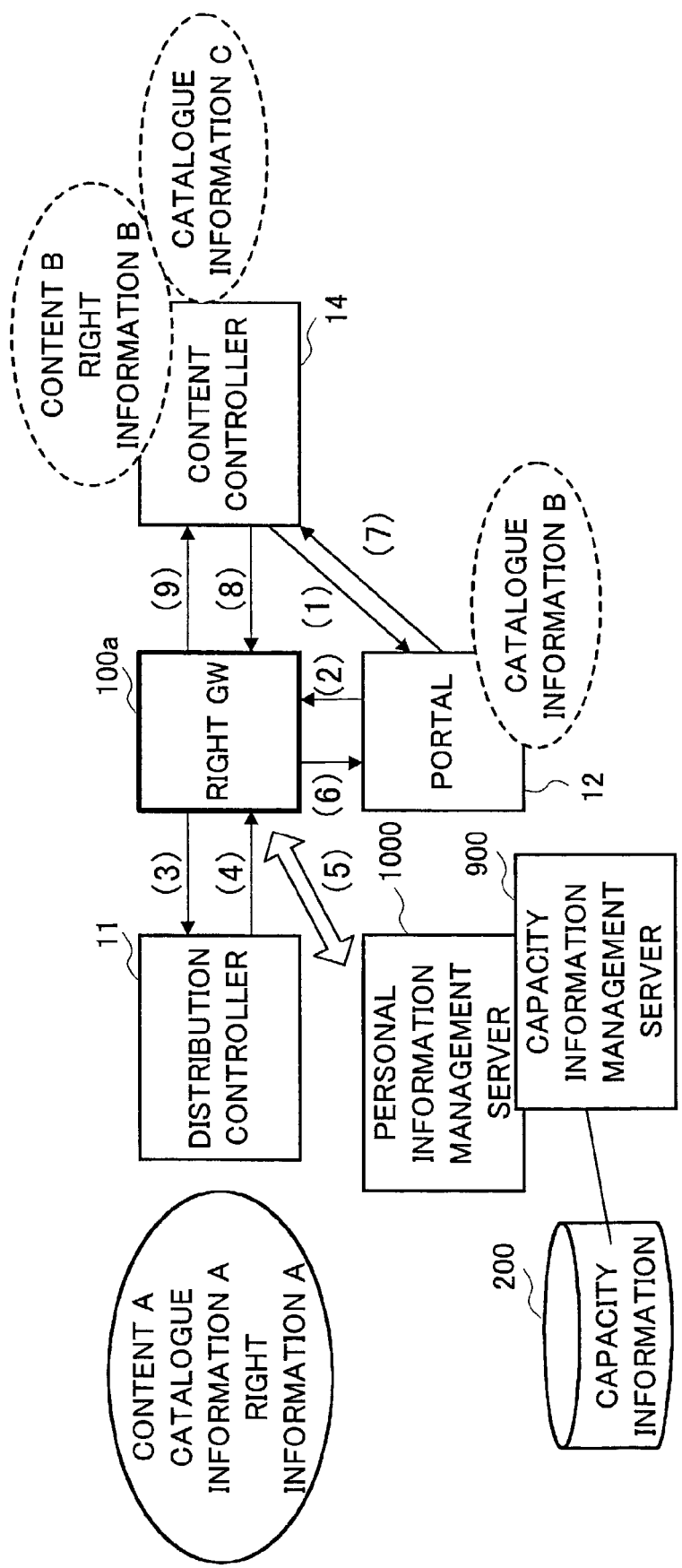
FIG. 25 is a core configuration diagram showing an example of a content distribution system (equipped with a personal information management server) according to Embodiment 9 of the present invention.

As shown in FIG. 25, this system has personal information management server 1000 that manages personal information such as client information and shopping history information in addition to capacity information management server 900.

In this system, the user accesses portal 12 through content controller 14, and when the ID of content controller 14 is transmitted to portal 12 (1), portal 12 transmits the received content controller ID to right gateway 100a (2).

Then, right gateway 100a receives catalogue information A and right information A from distribution controller 11 (3, 4).

Right gateway 100a obtains capacity information that corresponds to the content controller ID from capacity information management server 900 and meanwhile accesses personal information management server 1000 and obtains personal information such as client information and purchase history information from the content controller ID (5).

Right gateway 100a then chooses catalogue information that matches with the right management capacity of content controller 14 from catalogue information A received from distribution controller 11 and transmits this catalogue information to portal 12, whereupon catalogue information pertaining to, for instance, already purchased content is removed from the chosen catalogue information (6).

Portal 12 presents the catalog information transmitted from right gateway 100a to content controller 14 (7).

Then, when content controller 14 obtains the address of right gateway 100a and again makes a request to right gateway 100a for downloading of the content and catalogue information (8), right gateway 100a transmits content B and catalogue information B converted for downloading to content controller 14, to content controller 14 (9).

Thus, according to the present embodiment, it is possible to take personal information into account upon conversion of content and right information by right gateway 100.

Embodiment 10

With the tenth embodiment, the operation of a right gateway provided on an on-vehicle information gateway will be explained.

The on-vehicle information gateway operates as a gateway for on-vehicle apparatus such as car-navigation apparatus and car-audio apparatus and, when for instance content such as music information and map information distributed to household terminals are downloaded to the on-vehicle apparatus, mediates such data transmission.

Figure 26:
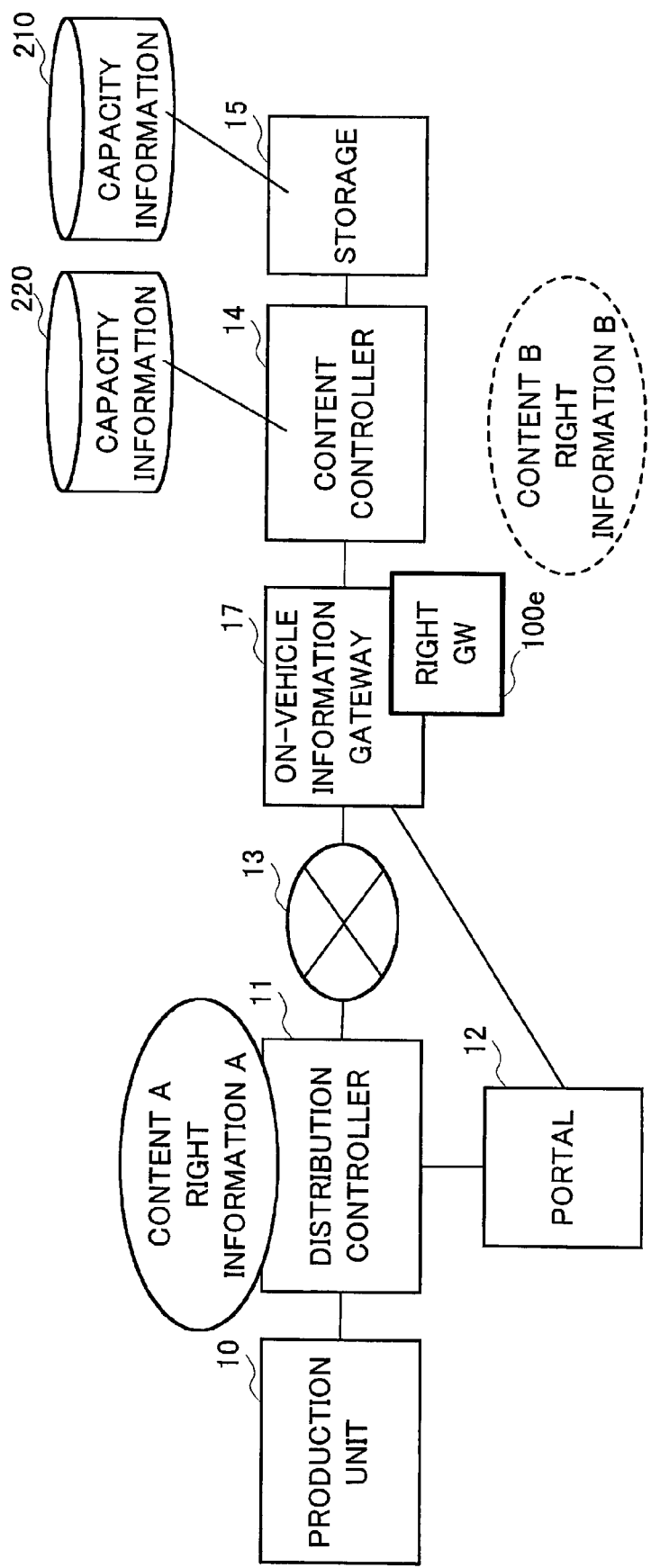
FIG. 26 is a configuration diagram showing an example of a content distribution system (an on-vehicle information gateway is equipped with a right gateway) according to Embodiment 10 of the preset invention.

FIG. 26 illustrates a system where content obtained within the household is transmitted by means of mobile telephone and downloaded to content controller 14 or storage 15 via on-vehicle information gateway 17 provided with right gateway 100e. In such case, distribution controller 11 is a mobile telephone, and content controller 14 is a car navigation apparatus or a car audio apparatus.

When the user executes control for content downloading to content controller 14, on-vehicle information home gateway 17 downloads content A and right information A from distribution controller 11.

Right gateway 100e obtains capacity information 220 and 210 of content controller 14 and storage 15 by means of on-vehicle information gateway 17. However, if on-vehicle information gateway 17 is provided with a database of information of on-vehicle apparatus, this operation will be unnecessary.

Then, making reference to capacity information 220 and 210 and right information A, based on the conversion policy of right information A, right gateway 100e converts content A and right information A according to need and transmits the conversion result to content controller 14 as content B and right information B. These content B and right information B will be stocked in content controller 14 or storage 15.

Figure 27:
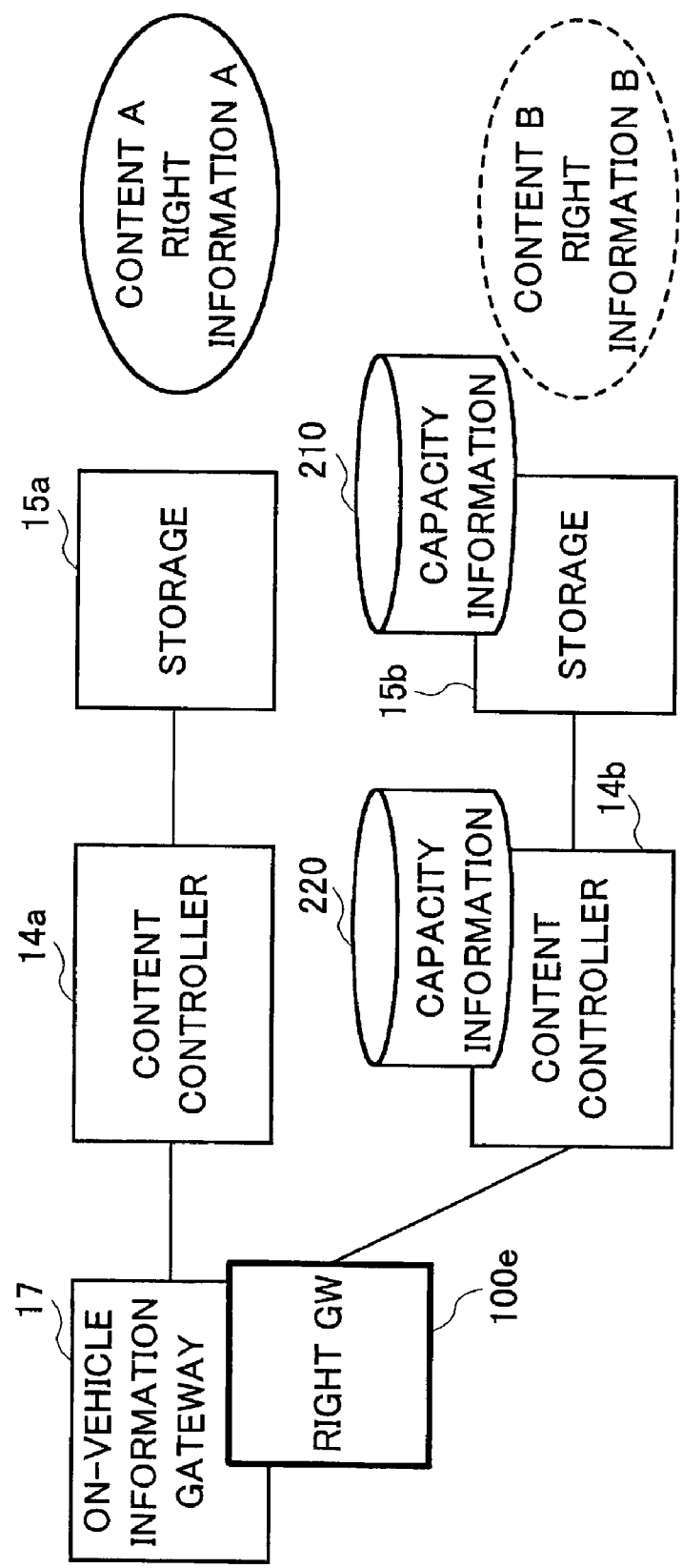
FIG. 27 is a configuration diagram showing another example of a content distribution system (an on-vehicle information gateway is equipped with a right gateway) according to Embodiment 10 of the preset invention.

FIG. 27 illustrates a configuration where content A stored in storage 15a is checked out to storage 15b through on-vehicle information gateway 17 provided with a right gateway 100e.

When the user performs checkout execution control of "from storage 15a to storage 15b" to content controller 14a, content controller 14a transmits a checkout request covering content A and right information A to on-vehicle information gateway 17.

Then, on-vehicle information gateway 17 accesses content controller 14b and obtains capacity information 220 and 210 of content controller 14b and storage 15b. However, if on-vehicle information gateway 17 has an information database pertaining to on-vehicle terminals, capacity information 220 and 210 do not need to be obtained.

Then, making reference to capacity information 220 and 210 and right information A, based on conversion policy, right gateway 100e converts content A and right information A according to need and transmits the conversion result to content controller 14b as content B and right information B. These content B and right information B will be stocked in storage 15b.

Thus, according to the present embodiment, the provision of a right gateway on vehicle enables license conversion of content downloaded to on-vehicle equipment.

Although a case has been described above where content is downloaded from the mobile telephone to on-vehicle equipment, the reverse is possible as well (that is, content is downloaded from on-vehicle equipment to the mobile telephone). In this case, the content controller is a mobile telephone and the distribution controller is on-vehicle equipment.

Embodiment 11

With this eleventh embodiment, the operation of a right gateway in the electronic ticket service will be explained.

With respect to electronic tickets, although there are cases where electronic tickets hold content that is to be displayed to the user, the following explanation concerns a case where right information to give the user permission (such as admission) alone circulates as electronic tickets.

Figure 28:
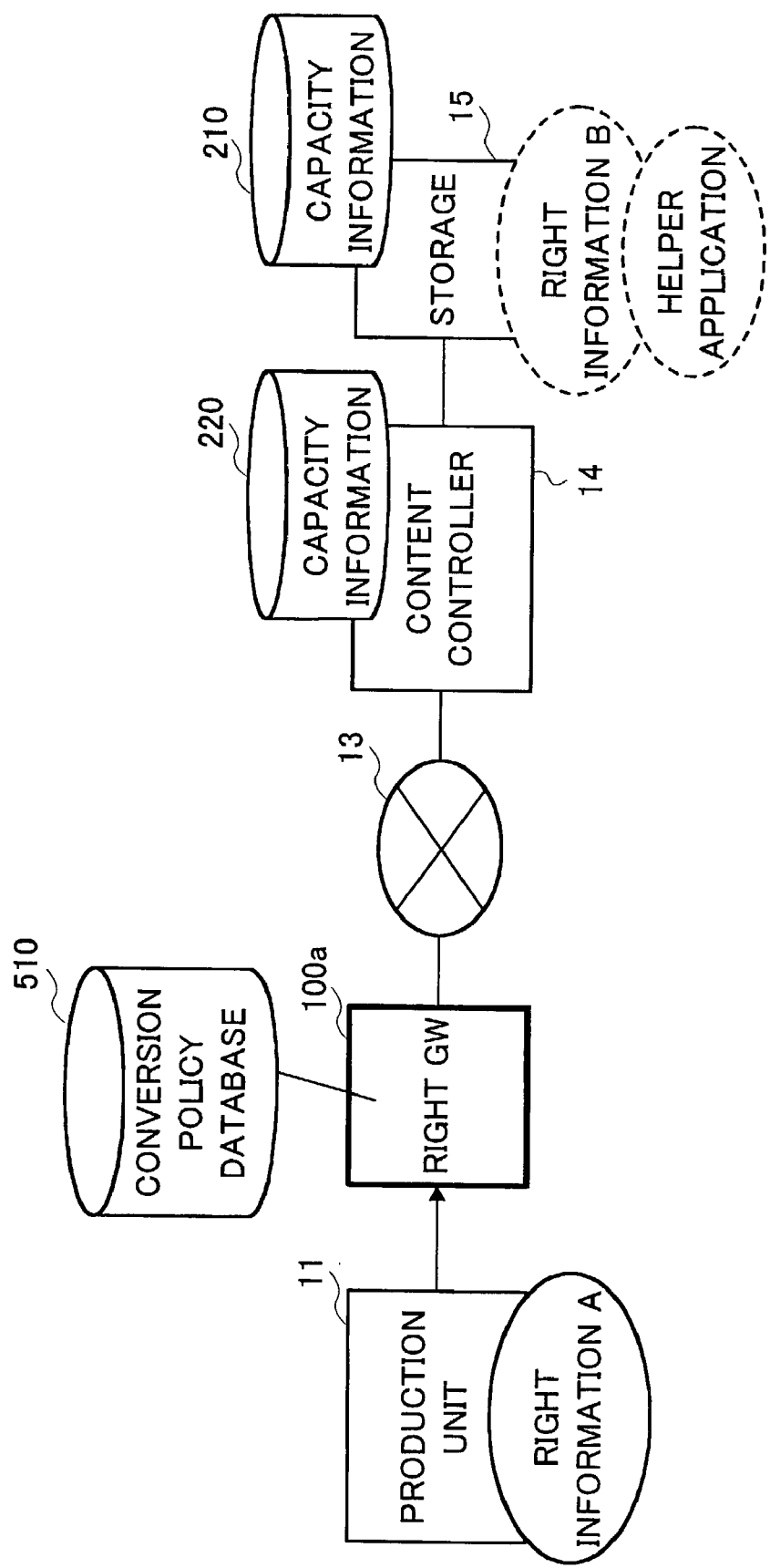
FIG. 28 is a core configuration diagram showing an example of a content distribution system (electronic ticket service provided with a right gateway) according to Embodiment 11 of the present invention.

FIG. 28 illustrates an electronic ticket service system where electronic tickets (right information A) can be purchased from content controller 14 via network 13.

When the user executes control for purchasing an electronic ticket to content controller 14 (including cases where payment is not included), content controller 14 transmits to right gateway 100a a request for downloading capacity information 220 of content controller 14 and capacity information 210 of storage 15 accompanied by right information (electronic ticket). However, if right gateway 100a has an information database pertaining to content controller 14 and storage 15, it suffices to transmit their respective ID's alone.

Then, making reference to capacity information 220 and 210 and right information A, based on conversion policy, right gateway 100a converts the right information (electronic ticket) according to need and transmits the conversion result to content controller 14 as right information B. This right information (electronic ticket) B will be stored in storage 15.

Specific examples of right information (electronic ticket) conversion that takes place in right gateway 100a include the following.

For example, provided that an electronic ticket that is provided with term and can be used how many ever times within the provided term is to be sent to a content controller and storage incapable of term management, the right information (electronic ticket) will be converted to an one time use ticket and helper application for making a request for downloading another electronic ticket after the use of the ticket.

On the other hand, provided that place where electronic tickets can be used is prescribed, and when an electronic ticket is to be distributed to a content controller and storage with which no limitation can be set with respect to place, the right information (electronic ticket) with place limitation will be converted to an helper application that will issue a request for downloading the electronic ticket upon moving to a valid place and transmitted.

Such helper application can be transmitted either apart from right information or as a part of right information.

Then, right gateway 100a receives an electronic ticket obtaining request based on helper application from content controller 14, and, if this request is a legitimate one, transmits appropriate right information (there are cases where content information is attached) to content controller 14.

Thus, with an electronic ticket service system with an intervening right gateway, it is possible to expand the range of equipment that enable the purchase of electronic ticket and to broaden the types of electronic tickets in electronic ticket services.

A case has been described above with the present embodiment where the condition of use of content is provided in respect to the term of use and the number of times of use. However, the condition of use can be provided in various perspectives such as follows:

Copy limitation
   Copy prohibition
Limitation by the number of times
   The number of operation times (playback times, display times, print times, copy times, etc.)
   The minimum time counted as one time (how much time should pass from start to be counted as one time)
Term limitation
   Date specification (start date/time and end date/time)
   Time since playback/display started
   Cumulative time of content use
   Time from issue of license
   Time from receipt of license
   From receipt of license to receipt of end (of license) command
   Specification of time zone (for example, morning, 10:00-15:00)

Place limitation
   Prohibited while in moving/Use allowed only while in move
   Location (school, home, specific location)
Limitation by weather
Limitation by temperature
Limitation by personal identification
   Age
   Sex
   List of commodity owned
   Use history
Limitation by performance of device
   Sound quality, image quality However, the provision of the condition of use pertaining to the weather, temperature, location, and personal identification are possible only in the presence of relevant detection means. Examples are as follows:

A sensor (decision-making device) is attached to a repository;
An inquiry server is provided, and function is provided for making inquiries to this server;
Information is distributed in a specific area through Bluetooth and wireless LAN and such, and a repository has compatible reception function.

Also, a case has been described above with the present embodiment as a specific example of conversion of condition of use (license conversion) where term limitation is converted to limitation on the number of times; nevertheless, license conversion such as follows is also possible:

<Conversion From Term to Number of Times>
When it is not possible to specify the minimum time, the number of allowed times will be greater than when the minimum time can be specified;
When the quality of sound (terminal performance) is poor, the number of allowed playback times will increase;

<Conversion From Number of Times to Number of Times>
As with terminals incapable of playing (displaying) the lyrics, the number of allowed times to play a song will increase;
As with terminals incapable of printing, the number of times display is allowed will increase up to the number of times printing is allowed;
When there is no time limit to display a screen or when there is no limitation that limits re-display or re-play:
   the number of content pages will decrease;
   there will be fewer characters;
   license will be required for every paragraph (content section) or for every location;
   license will be required for each place (location);
When the minimum time cannot be specified:
   (a) if it does not count as one time unless playback/display reaches the end, the number of times will decrease;
   (b) if even one second of playback/display counts one time, the number of times will increase;

<Conversion From Term to Term>
If the end date/time cannot be detected, the term will convert to "until receipt of an end command";

<Conversion From Place to Term (Specification of Time Zone)> (When Place Cannot be Detected)
Right that does not allow on the train will convert to right that does not allow during rush-hours;
Right that allows only in schools will convert to right that allows during 9:00-15:00;

<Conversion From Temperature to Term (Time Zone/Term Specification)>

Right that allows when the temperature is above 20° will convert to right with term and time limitation (for instance, day time in summer).

Furthermore, right conversion is possible depending on the condition upon use of electronic tickets. Specific examples of such condition include the following:

1) Whether or Not User Authentication is Performed Upon Use of Ticket

Types of user authentication include, for example, PIN (Personal Identifier Number) and biological authentication. Normally a four digit number is input for a PIN, however, security improves in correlation with the number of digits. There are cases where biological authentication is more secure than PIN, and of biological authentication, generally, iris authentication is credited higher security than fingerprint authentication. Conversion may take on different forms depending on the presence/absence of such user authentication or depending on the means of user authentication in the presence thereof.

2) Communication Path Security Level

For instance, Bluetooth itself has communication path security functions, the infrared ray has no functions pertaining to secure communication. As thus described, it is possible to modify conversion depending on the presence/absence of communication path security functions.

3) Operability

For example, the communication time is short in the touch-and-go service of the IC card, and this makes the likelihood that processing ends in error high. In contrast, the communication distance is long with Bluetooth and the infrared ray, which can well accommodate the lengthened communication time due to retransmission processing and such, an the likelihood of error is low. Also, in cases of communication that involves contact with the IC card, the user cannot move device until processing is complete, thereby making the likelihood of error low. As described thus, conversion is subject to variation depending on whether or not the communication path with a low likelihood of error occurrence during operation is used.

By thus subjecting right conversion to variation depending on the conditions upon use of an electronic ticket, it is possible to change the right conversion method in a favorable way to the user, provided that the user's terminal meets the condition for the use of the ticket required by the ticket issuer. User distinction is thus possible.

Consistent in the above is that right is converted in consideration of the communication means (for example, Bluetooth, infrared ray, non-contact) used upon the collection of electronic ticket.

That is, even when the types of electronic tickets are the same, there are cases where the communication means upon use of the tickets vary depending on the user terminal. Possible communication means here include Bluetooth, infrared ray, non-contact, as well as other forms of wireless communication. When the security level varies depending on communication means, right conversion is subjected to variation in accordance with the communication means.

Now, explanation will be given regarding the features (advantages and disadvantages) of Bluetooth, infrared ray, and non-contact.

Features of Bluetooth include that (1) it has security for theft prevention as a communication standard; (2) the communication distance is long and processing, although time-demanding, can finish correctly; and (3) it has no directivity and accordingly there is, for instance, no need to turn the terminal in a certain direction.

Features of the infrared ray include that (1) it has no security for theft prevention as a communication standard; and (2) it has directivity.

Features of non-contact include that (1) given short communication distance, errors increase when processing is time-demanding; (2) it attempts to finish processing in short time (as in "touch-and-go"), which results in increased errors; and (3) since it is designed for services with short-term processing (such as "touch-and-go"), there are systems that even lack user authentication such as password input, and in such systems, unless the user is requested to input a password upon use, the user will be able to use a ticket in a device that he has picked up somewhere (that he does not own).

Since the above-noted features can be advantages and disadvantages depending on the situation, various changes to accommodate respective services need to be made upon actual application.

For example, when a limit on term is to be changed to a limit on the number of times, conversion will be performed in a way that will increase the number of times, with respect to terminals that support more secure communication means as the communication path at the time tickets are used, and on the other hand, in case of insecure communication path, conversion will be performed in such a way that will decrease the number of times (for instance, one-use tickets). By this means, distinction can be made between services. Consequently, users that have more secure devices can save trouble, and the service operator side can control services in such a way as to reduce errors during operation.

To be more specific, where there is mobile terminal A in which ticket application A is implemented that has management functions for limitation by term and limitation by the number of times and yet this mobile terminal A supports only non-contact for communication means for ticket collection processing, given the insecure communication path, tickets valid for several times of use will not be distributed and will be transmitted only after conversion to tickets with term limitation or for one time use. In contrast to this, where there is mobile terminal B with the identical ticket application A and this mobile terminal B supports Bluetooth for communication means for ticket collection processing, given the secure communication path, tickets valid for several times of use will be distributed. In other words, given that tickets valid for several times of use are expensive, relevant services will be allowed only on the conditions of secure communication path.

Furthermore, where there is mobile terminal C in which ticket application B is implemented that has management functions as to the number of times and this mobile terminal C supports only non-contact as communication means for ticket collection processing, given the insecure communication path, tickets will be distributed with moderate limitation on the maximum number of times (for instance, maximum number of times=500). In contrast, where there is mobile terminal D in which the identical ticket application B is implemented and this mobile terminal D supports Bluetooth as communication means for ticket collection processing, given the secure communication path, tickets will be described with expanded limitation on the maximum number of times (for instance, maximum number of times=1000).

In addition, it is possible to subject right conversion to variation depending on whether a storage device has PIN input functions.

As made clear in the above explanation, according to the present invention, even under the conditions where limitations on use intended to protect the copyright of content have diversified and the production of equipment and recording mediums provided with various DRM functions compatible therewith is in progress, it is possible to expand the types of equipment and recording mediums and thus promote the use of content without causing damage to the copyright of the content.

In addition, without limit to distribution services for music and such, it is possible to enhance the convenience of systems such as electronic ticket services and thus promote the use of such on-line services.

On the other hand, content creators will be free from the trouble of setting the condition of use in consideration of DRM functions of respective types of content-use equipment.

On portal pages used to purchase content, only such content will be displayed that can be used with the user's equipment, thereby removing the threat of purchasing wrong content that the user cannot use.

Furthermore, the system can provide useful advice when the user makes a purchase of new content use equipment and recording mediums.

The present invention is not limited to the above-described embodiments, and various variations and modifications may be possible without departing from the scope of the present invention.

This application is based on Japanese Patent Application No.2001-366930 filed on Nov. 30, 2001 and Japanese Patent Application No.2002-326067 filed on Nov. 8, 2002, entire content of which is expressly incorporated by reference herein.

What is claimed is:

1. An information converting apparatus, comprising:
a first obtainer that obtains right information of content which is transmitted to a repository;
a second obtainer that obtains right management capacity information of the repository, the right management capacity information specifying conditions of content use which the repository has a capacity to comply with;
a storage that holds a conversion policy for changing right information according to the right management capacity information of the repository;
a converter that converts the right information obtained by said first obtainer, the conversion being based on the right management capacity information obtained by said second obtainer and following the conversion policy; and
a transmitter that transmits a result of the conversion by said converter to the repository.

2. The information converting apparatus according to claim 1, wherein the conversion policy describes a conversion of an attribute of the right information.

3. The information converting apparatus according to claim 1, wherein the conversion policy describes a conversion of the right information which is based on a communication means used by the repository.

4. The information converting apparatus according to claim 1, wherein the conversion policy is recorded in the right information.

5. The information converting apparatus according to claim 1, wherein an ID specifying the conversion policy is recorded in the right information.

6. The information converting apparatus according to claim 5, wherein said converter obtains the conversion policy corresponding to the ID from a conversion policy server that performs conversion policy management.

7. The information converting apparatus according to claim 1, wherein a provision of an approval for conversion policy change is recorded in the right information, and the information converting apparatus further comprises a reviser that revises the conversion policy based on the provision of the approval for conversion policy change recorded in the right information.

8. The information apparatus according to claim 7, wherein a right execution history pertaining to use of content is recorded in the right information, and said reviser changes a way of converting a condition of use of content provided by the conversion policy based on the right execution history recorded in the right information.

9. The information converting apparatus according to claim 7, wherein a right execution history pertaining to use of content is recorded in the right information, and said reviser changes a way of modifying content provided by the conversion policy based on the right execution history recorded in the right information.

10. The information converting apparatus according to claim 1, wherein the information converting apparatus is provided between repositories that exchange files, and further comprises a storage that holds a performance record of a file exchange, wherein said converter performs conversion processing in such a way that reflects the performance record of the file exchange.

11. An information converting apparatus, comprising:
a first obtainer that obtains right information of content which is transmitted to a repository;
a second obtainer that obtains right management capacity information of the repository, the right management capacity information specifying conditions of content use which the repository has a capacity to comply with;
a converter that converts the right information obtained by said first obtainer, the conversion being based on the right management capacity information obtained by said second obtainer and following a conversion policy;
a transmitter that transmits a result of the conversion by said converter to the repository;
a capacity database which stores at least one of right management capacity information of the repository, a description of services adequate to the right management capacity information of the repository, and use history information of the repository; and
a provider that, by referring to said capacity database, provides a service adequate for the repository.

12. The information converting apparatus according to claim 11, further comprising a searcher that searches for a service adequate for the repository based on at least one of the right management capacity information and the use history information of the repository and of other repositories, wherein said provider provides a service found by said searcher.

13. The information converting apparatus according to claim 1, wherein the information converting apparatus a repository which transmits the content are provided in a single device.

14. The information converting apparatus according to claim 1, wherein the information converting apparatus and the repository are provided in a single device.

15. The information converting apparatus according to claim 1, wherein the information converting apparatus, a repository which transmits the content and the repository which receives the content are provided in a single device.

16. The information converting apparatus according to claim 1, wherein the information converting apparatus is provided in a device apart from the repository.

17. A content distribution system comprising the information converting apparatus of claim 1.

18. An information conversion method, comprising:
obtaining right information of content which is transmitted to a repository;
obtaining right management capacity information of the repository, the right management capacity information specifying conditions of content use which the repository has a capacity to comply with;
converting the obtained right information based on the obtained right management capacity information and following a conversion policy for changing the right information according to the right management capacity information of the repository; and
transmitting a result of the conversion to the repository.

19. A computer-readable medium which stores an information conversion program, comprising:
a first obtaining code segment for obtaining right information of content transmitted to a repository;
a second obtaining code segment for obtaining right management capacity information of the repository, the right management capacity information specifying conditions of content use which the repository has a capacity to comply with;
a conversion code segment for converting the obtained right information based on the obtained right management capacity information and following a conversion policy for changing the right information according to the right management capacity information of the repository; and
a transmission code segment for transmitting a result of the conversion to the repository.

20. An information converting apparatus, comprising:
a first obtainer that obtains right information of content transmitted from a repository at a transmitting end to a repository at a transmission destination;
a second obtainer that obtains right management capacity information of the repository at the transmission destination, the right management capacity information indicating types of user authentication means;
a storage that holds a conversion policy for changing right information according to the right management capacity information of the repository at the transmission destination;
a converter that converts the right information obtained by said first obtainer, the conversion being based on the right management capacity information obtained by said second obtainer and following the conversion policy; and
a transmitter that transmits a result of the conversion by said converter to the repository at the transmission destination.

21. An information converting apparatus, comprising:
a first obtainer that obtains right information of content transmitted from a repository at a transmitting end to a repository at a transmission destination;
a second obtainer that obtains right management capacity information of the repository at the transmission destination, the right management capacity information indicating types of communication means provided by the repository at the transmission destination;
a storage that holds a conversion policy for changing right information according to the right management capacity information of the repository at the transmission destination;
a converter that converts the right information obtained by said first obtainer, the conversion being based on the right management capacity information obtained by said second obtainer and following the conversion policy; and
a transmitter that transmits a result of the conversion by said converter to the repository at the transmission destination.

* * * * *

UNITED STATES PATENT AND TRADEMARK OFFICE
CERTIFICATE OF CORRECTION

PATENT NO. : 7,424,034 B2 Page 1 of 1
APPLICATION NO. : 10/307362
DATED : September 9, 2008
INVENTOR(S) : K. Kawaguchi et al.

It is certified that error appears in the above-identified patent and that said Letters Patent is hereby corrected as shown below:

At column 24, line 52 (claim 13, line 2) of the printed patent, the word --and-- should follow the word "apparatus".

Signed and Sealed this

Thirteenth Day of January, 2009

JON W. DUDAS
*Director of the United States Patent and Trademark Office*